United States Patent
Xue et al.

(10) Patent No.: US 9,820,285 B2
(45) Date of Patent: Nov. 14, 2017

(54) SIGNAL TRANSMISSION/RECEPTION METHOD AND APPARATUS OF D2D TERMINAL

(71) Applicant: Samsung Electronics Co., Ltd., Gyeonggi-do (KR)

(72) Inventors: Peng Xue, Hwaseong-si (KR); Hyunseok Ryu, Yongin-si (KR); Seunghoon Park, Seoul (KR); Sangwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 14/820,429

(22) Filed: Aug. 6, 2015

(65) Prior Publication Data
US 2016/0044652 A1 Feb. 11, 2016

Related U.S. Application Data

(60) Provisional application No. 62/033,798, filed on Aug. 6, 2014, provisional application No. 62/076,156, filed on Nov. 6, 2014.

(51) Int. Cl.
*H04W 72/04* (2009.01)
*H04W 56/00* (2009.01)
(Continued)

(52) U.S. Cl.
CPC ....... *H04W 72/048* (2013.01); *H04W 56/001* (2013.01); *H04W 74/006* (2013.01);
(Continued)

(58) Field of Classification Search
CPC . H04W 72/048; H04W 72/04; H04W 56/001; H04W 76/048; H04W 76/023; H04W 76/046; H04W 74/006
(Continued)

(56) References Cited

U.S. PATENT DOCUMENTS 7,983,702 B2 7/2011 Li et al.
8,213,360 B2 7/2012 Koskela et al.
(Continued)

FOREIGN PATENT DOCUMENTS

| EP | 2665325 A1 | 11/2013 |
|---|---|---|
| KR | 20150027690 A | 3/2015 |
| WO | WO 2015034234 A1 | 3/2015 |

OTHER PUBLICATIONS

Baccelli, et al.; "On the Design of Device-to-Device Autonomous Discovery"; 2012 Fourth International Conference on Communication Systems and Networks (COMSNETS); IEEE; Jan 3-7, 2012; 11 pages.
(Continued)

*Primary Examiner* — Kwang B Yao
*Assistant Examiner* — Syed M Bokhari

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A terminal includes a transceiver configured to transmit or receive signals, and a controller configured to determine whether a current subframe is a subframe in which the terminal has to monitor a PDCCH, in response to the current subframe not being the subframe, determine whether a discovery pool for the terminal exists, and when the discovery pool for the terminal exists, operate a D2D discovery operation in the current subframe.

18 Claims, 25 Drawing Sheets

(51) Int. Cl.
 H04W 74/00 (2009.01)
 H04W 76/02 (2009.01)
 H04W 76/04 (2009.01)
(52) U.S. Cl.
 CPC ....... *H04W 76/023* (2013.01); *H04W 76/046* (2013.01); *H04W 76/048* (2013.01)
(58) Field of Classification Search
 USPC .................................. 370/329, 311, 350, 254
 See application file for complete search history.

(56) References Cited

U.S. PATENT DOCUMENTS

| | | | |
|---|---|---|---|
| 8,705,421 | B2 | 4/2014 | Li et al. |
| 2009/0017851 | A1 | 1/2009 | Li et al. |
| 2012/0269178 | A1 | 10/2012 | Li et al. |
| 2012/0281566 | A1 | 11/2012 | Pelletier et al. |
| 2013/0182626 | A1 | 7/2013 | Kuo |
| 2014/0003262 | A1* | 1/2014 | He .................. H04W 28/08 370/252 |
| 2014/0112162 | A1 | 4/2014 | Tavildar et al. |
| 2014/0112332 | A1* | 4/2014 | Park ................ H04W 56/002 370/350 |
| 2014/0161095 | A1 | 6/2014 | Nan et al. |
| 2014/0254429 | A1* | 9/2014 | Wang ............... H04L 5/0037 370/254 |
| 2015/0117375 | A1* | 4/2015 | Sartori ............. H04W 56/001 370/329 |
| 2015/0271752 | A1* | 9/2015 | Lee ................. H04W 52/0216 370/311 |
| 2016/0088624 | A1* | 3/2016 | Lee .................. H04W 76/023 370/329 |

OTHER PUBLICATIONS

Ericsson, "Synchronization Procedures for D2D Discovery and Communication", 3GPP TSG RAN WG1 Meeting #76, Prague, Czech Republic, dated Jan. 31, 2014, 7 pgs.
ZTE, "Considerations on D2D Proximity Discovery", 3GPP TSG RAN WG1 Meeting #83, Barcelona, Spain, dated Aug. 10, 2013, 5 pgs.
ZTE, "Discussions on Necessity of Supporting Discovery Type 2", 3GPP TSG RAN WG1 #75, San Francisco, USA, dated Nov. 2, 2013, 2 pgs.
International Search Report issued for PCT/KR2015/008220 dated Nov. 24, 2015, 3 pgs.
Communication pursuant to Rule 164(1) EPC dated Sep. 1, 2017 in connection with European Patent Application No. 15 84 4060.
Catt, "Discussion on D2D synchronization sources", 3GPP TSG RAN WG1 Meeting #78, Aug. 18-22, 2014, 4 pages, R1-142894.
"3rd Generation Partnership Project; Technical Specification Group Radio Access Network; Study on LTE Device to Device Proximity Services; Radio Aspects (Release 12)", 3GPP TR 36.843 V12.0.1, Mar. 2014, 50 pages.

* cited by examiner

SIGNAL TRANSMISSION/RECEPTION METHOD AND APPARATUS OF D2D TERMINAL

CROSS-REFERENCE TO RELATED APPLICATION(S) AND CLAIM OF PRIORITY

The present application claims priority to U.S. Provisional Patent Application No. 62/033,798 filed on Aug. 6, 2014 and U.S. Provisional Patent Application No. 62/076,156 filed on Nov. 6, 2014, the entire disclosure of which are hereby incorporated by reference.

TECHNICAL FIELD

The present invention relates to Device-to-Device (D2D) communication and, in particular, to a signal transmission/reception method and apparatus of a D2D terminal.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the D2D network, one of the important functions is the discovery among the D2D terminals (hereinafter, the terms 'D2D mobile station', 'D2D User Equipment (UE)', and 'D2D terminal' are interchangeably used).

SUMMARY

To address the above-discussed deficiencies, it is a primary object to provide a signal transmission/reception method of a terminal supporting cellular communication and Device-to-Device (D2D) communication is provided. The signal transmission/reception method includes determining whether Discontinuous Reception (DRX) mode entry condition is fulfilled, determining, when the DRX mode entry condition is fulfilled, whether a current subframe is the subframe in which the terminal has to monitor a Physical Downlink Control Channel (PDCCH) in the DRX mode in an RRC_Connected state, monitoring, when the current subframe is the subframe in which the terminal has to monitor the PDCCH, the PDCCH, determining, when the current subframe is not the subframe in which the terminal has to monitor the PDCCH, whether a discovery pool for the terminal exists, and switching, when the discovery pool related to the terminal exists, to operate a D2D discovery operation in the current subframe.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
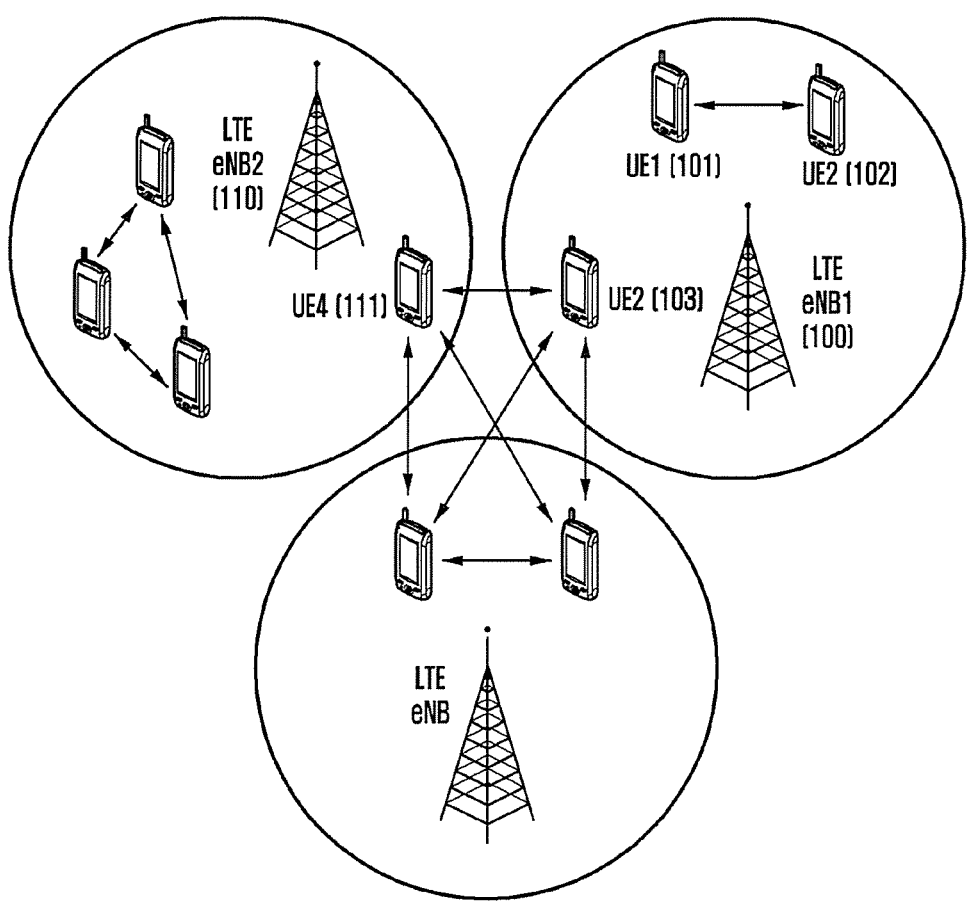
FIG. 1 is a diagram illustrating a D2D network for communication between D2D UEs.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The first embodiment is directed to a periodic WAN channel monitoring method for receiving WAN data in the situation where the UE has one Radio Frequency (RF) unit so as not to support simultaneous WAN and D2D operations and a D2D/WAN switching method of a D2D UE in consideration of the WAN operation with priority.

First, a description is made of the D2D/WAN switching method of the UE in the RRC_Idle state (hereinafter, referred to as RRC_Idle UE).

In the case that simultaneous WAN and D2D operations are not allowed due to the hardware restriction during the D2D discovery period, the UE has to have a capability of switching between the WAN and D2D operations. In the case of the RRC_Idle UE, the WAN operation which is essentially necessary should be processed with priority even in the D2D discovery period. Assuming that the RRC_Idle UE has camped on a cell, the cell reselection is an essential operation in association with the WAN connection so as to have higher priority than any D2D operation. In the case of receiving Multimedia Broadcast Multicast Service (MBMS), if the UE is supposed to receive the MBMS services, the MBMS reception operation has a higher priority than any D2D operation. It may be possible for the eNB to determine the priority between the MBMS reception operation and D2D operation of a UE. In the case that two operations are conflicting, the eNB may instruct the UE to receive the MBMS or D2D data with priority.

Since the paging operation is also one of important WAN operations of the RRC_Idle UE, it has a higher priority than the D2D operation. It is assumed that the RRC_Idle UE is operating in the Discontinuous Reception (DRX) mode with a predetermined paging cycle. During the discovery period, the UE may switch to the D2D discovery operation in the DRX sleep state. Such a D2D/WAN switching may be configured as default operation and, in the case of being overlapped with the D2D discovery period, the system parameter iDRX_D2d_Enabled may be used for indicating the UE operating in the D2D mode during the DRX cycle. Considering inter-cell discovery, two parameters, i.e. iDRX_SCell_D2D_Enabled and iDRX_NCell_D2D_Enabled, may be used. These parameters may be transmitted to the UE through system information or higher layer signaling. In the case that the discovery periods of the serving cell and neighboring cells are overlapped in the state that the iDRX_SCell_D2D_Enabled is activated, the UE may switch to the D2D operation. In the case that the discovery period and DRX cycle of the neighboring cell are overlapped in the state that the iDRX_NCell_D2D_Enable is activated, the UE may switch to the D2D operation.

However, the paging operation of receiving Physical Downlink Control Channel (PDCCH) in the paging frame for a specific UE has to have the priority compared to the D2D operation for synchronization with the serving cell, serving cell signal quality measurement, and paging information acquisition. Accordingly, the UE has to decode PDCCH in at least subframe 0 and subframe 5 and a specific paging occasion (PO) subframe corresponding thereto (subframe 9, subframe 4, subframe 0, or subframe 5 may be the PO subframe). If there is no WAN operation (e.g. no paging message addressed to the UE) in the subframes with the exception of the subframes 0, 5, and PO subframe in the paging frame, the UE is capable of switching to the D2D discovery operation. This may be configured as a default setting or indicated by the parameter iPF_D2D_Switching. Such operation is advantageous in terms of increasing the frequency bandwidth for switching or the time duration for D2D operation.

FIG. 1 is a diagram illustrating a D2D network for communication between D2D UEs. The UE 1 101 located in the coverage area of an evolved Node B (eNB) 100 (hereinafter, the terms eNB' and 'base station' are interchangeably used) may communicate with the UE 2 102 located in the coverage area of the eNB 1 100. Also, the UE 2 103 located in the coverage area of the eNB 1 100 may communicate with the UE 4 111 located in the coverage area of the eNB 2 110. In this way, the UEs located in the same cell or different cells may discover and communicate with each other.

In each cell, a predetermined length of period is allocated to appear periodically for D2D discovery.

Figure 2:
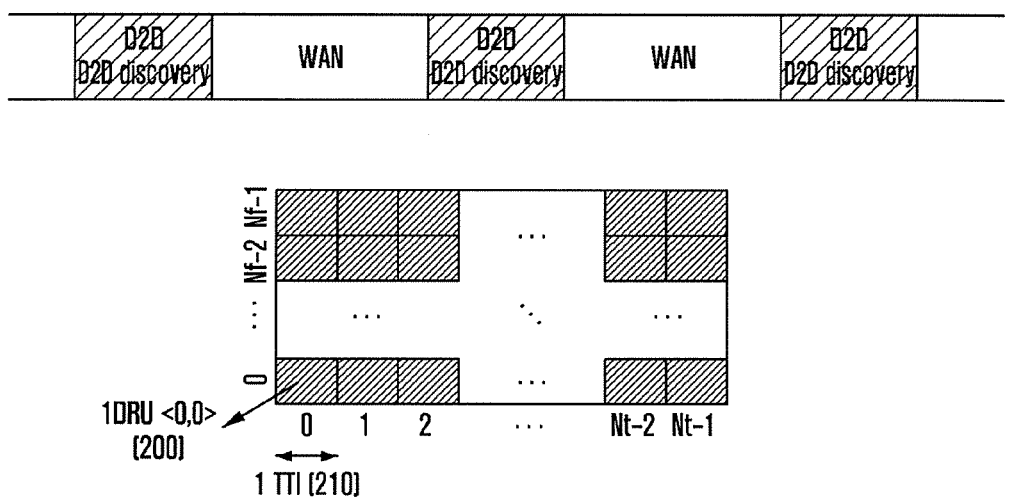
FIG. 2 is a diagram illustrating a discovery frame structure of a D2D network.

FIG. 2 is a diagram illustrating a discovery frame structure of a D2D network. As shown in FIG. 2, a discovery period is comprised of a plurality of Discovery Resource Unit (DRUs). The DRU occupies 1 Transmission Time Interval (TTI) on the time axis and one or more Resource Blocks (RBs) on the frequency axis. One DRU is used for discovery message transmission of a UE. The eNB can allocate the DRUs to the UEs in the RRC_Connected state in the discovery period. A UE in the RRC_Idle state can select a DRU randomly for discovery message transmission.

The eNB broadcasts the system information including D2D discovery pool information such as offsets between the discovery pools of the serving and neighboring cells, period, and cycle.

Figure 3A:
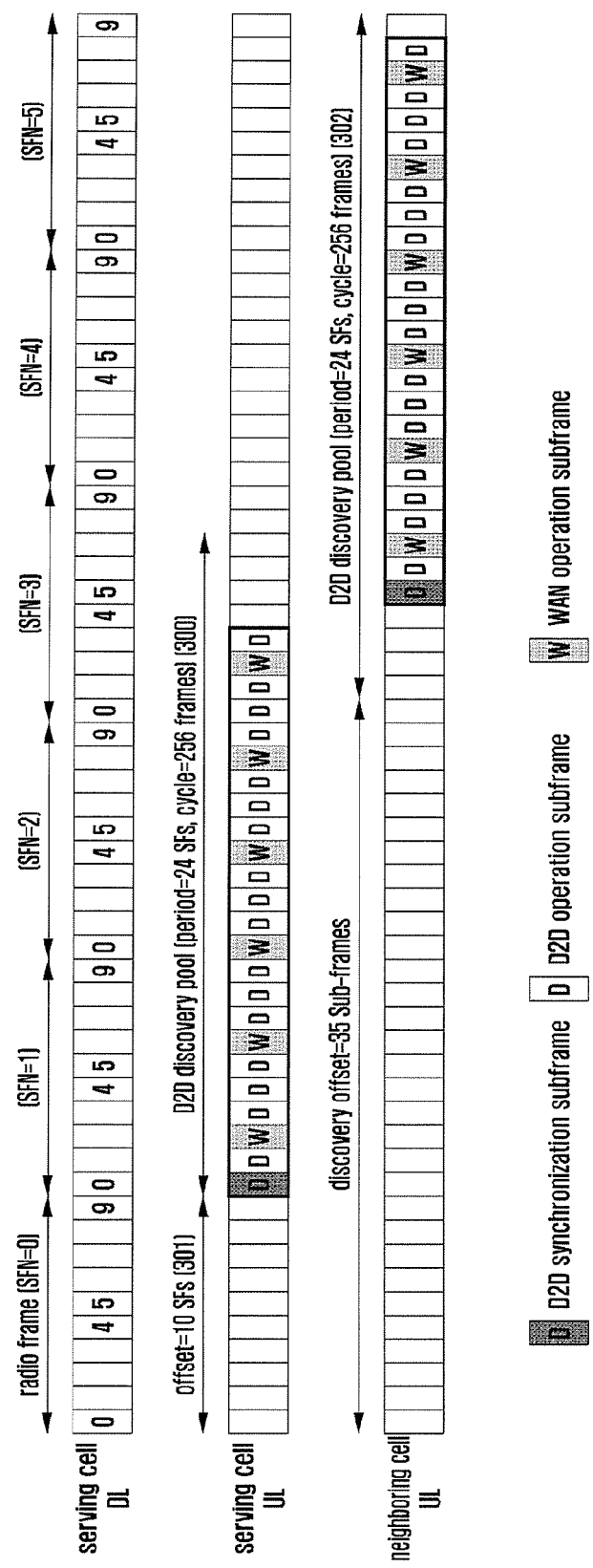
FIGS. 3A and 3B are diagrams illustrating exemplary D2D discovery pool configurations.
Figure 3B:
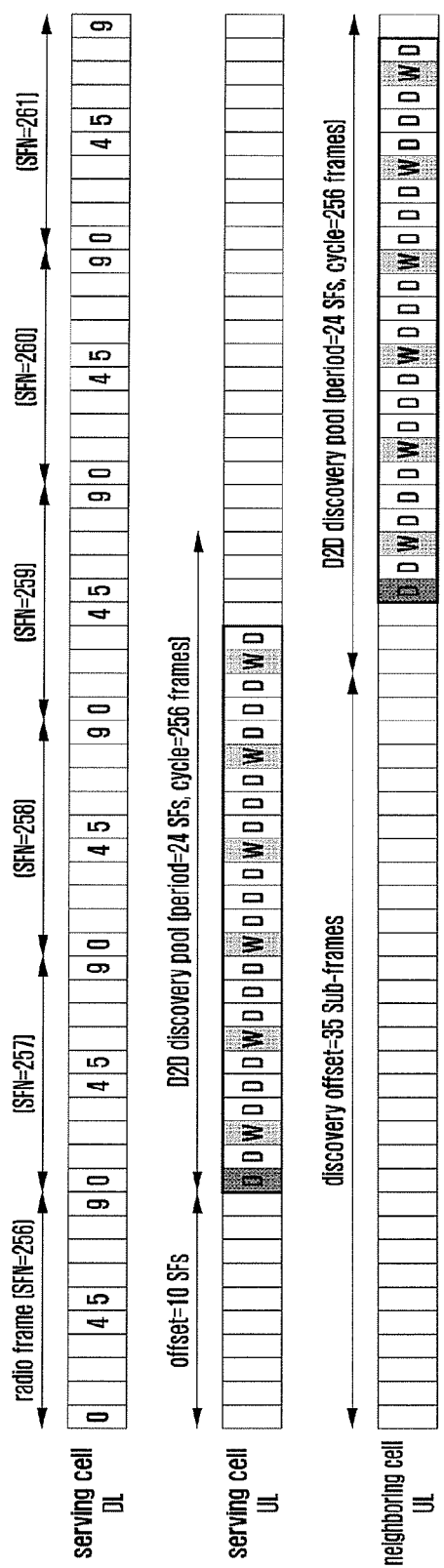

FIGS. 3A and 3B are diagrams illustrating exemplary D2D discovery pool configurations. As shown in FIGS. 3A and 3B, the discovery pool 300 of the serving cell has a duration of 24 subframes which repeats at a cycle of 256 subframes. The discovery pool 300 of the serving cell has an offset 301 of 10 subframes corresponding to the System Frame Number (SFN)=0. Likewise, the discovery pool 302 of the neighboring cell has a duration of 24 subframes which repeats at a cycle of 256 subframes and an offset 303 of 35 subframes starting from the subframe 0 of the radio frame corresponding to SFN=0. Whether the subframes constituting the discovery pool are used for the D2D communication or the Wide Area network (WAN) communication is expressed by a bitmap in which the bits set to 1 correspond to the subframes for D2D communication and the bits set to 0 correspond to the subframes for WAN communication (or vice versa). In order to make it possible for the UEs located in the unsynchronized cells to discover with each other, the first subframe of each discovery pool is configured as the D2D synchronization subframe.

As shown in FIG. 1, the D2D UE can discover other D2D UEs located in the neighboring cells as well as the same cell. The D2D UE transmits the discovery message using the discovery resource pool configured by the serving eNB. Depending on the resource allocation scheme, there are two types of discovery procedures. In the first type of discovery, the UE selects the discovery resource autonomously according to a predetermined rule. In the second type of discovery, the eNB allocates the resource for the UE to transmit the discovery message.

The D2D communication can support broadcast and multicast and the communication between the UEs in the same group. The communication resource pool is comprised of two parts, i.e. a scheduling assignment (SA) pool and a data pool. In the SA pool, a Tx UE transmits an SA message indicating the Rx UE as the target of the data resource information for use in the data pool. Afterward, the Tx UE transmits the data to the Rx UE using the corresponding data resource. The Rx UE decodes the SA in the SA pool and then receives the data resource in the data pool which is indicated by the SA. Depending on the SA and data resource allocation scheme, two communication modes are defined. In the first communication mode, the eNB schedules the SA/data resources used by the UEs. For example, the eNB can send the UE a D2D grant. In the second communication mode, each UE selects the SA/data resource autonomously in the resource pool.

In each cell, the eNB configures the resource pools for the D2D discovery and communication and broadcasts the resource pool information in a System Information Block (SIB).

Figure 4:
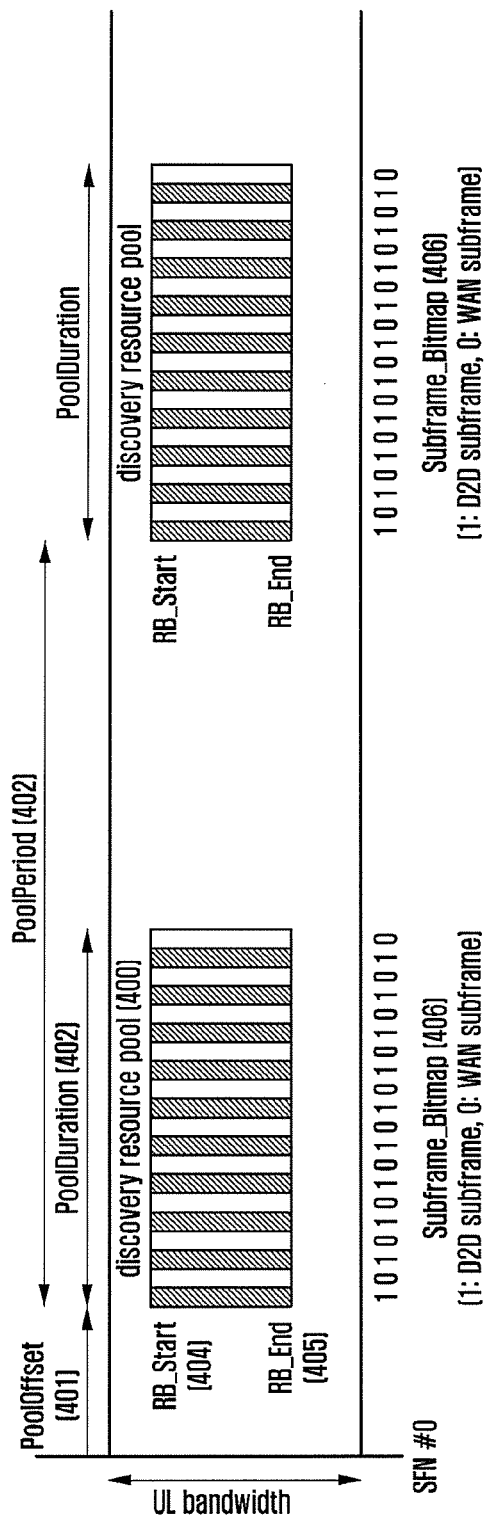
FIG. 4 is a diagram illustrating an exemplary D2D discovery pool configured on the LTE uplink (UL) frequency.

FIG. 4 is a diagram illustrating an exemplary D2D discovery pool configured on the LTE uplink (UL) frequency. The parameters of each discovery resource pool 400 can include Pool_Offset 401, Pool_Duration 403, Pool_Period 402, Pool_Subframe_Bitmap 406, Pool_RB_Start 404, and Pool_RB_End 405. The eNB can configure the type 1 and type 2 discovery resource pools and mode 1 and mode 2 communication resource pool independently.

In order to acquire synchronization between D2D UEs, the eNB allocates the resource for D2D synchronization signal (D2DSS) transmission. The UE uses the D2DSS to acquire time and frequency synchronizations. The D2DSS can be categorized into one of cell-specific primary D2DSS and secondary D2DSS. The D2DSS Tx UE can be designated by the eNB or determined subject to a predetermined D2DSS transmission condition. Through the D2DSS transmission in the cell coverage, it is possible for the UEs located in the neighboring cell and the out-of-coverage UEs to acquire synchronization with the cell to perform discovery/communication with each other. Using the D2DSS transmission resource, it is possible to transmit the physical D2D synchronization channel (PD2DSCH) which includes part of system information, cell information, and resource pool information for use by the UE.

However, if the D2D UE is in the D2D mode in which it continues transmitting or receiving discovery signals during the discovery period, there can be a delay of WAN transmission or reception. Although the UE switches between D2D and WAN modes based on the D2D/WAN bitmap in the discovery pool, it cannot perform the mode switching as indicated in the bitmap in some cases, especially when the discovery between the unsynchronized cells is required.

Also, since the D2D resource pools have respective offsets, durations, and periodicities, it can occur that the some resource pools are overlapped. It can also be possible that the D2DSS resource is overlapped with other resource pools. When the different D2D resource pools are overlapped, it is necessary for the UE to determine the priorities of the data transmissions.

Also, there is a need of a method for demodulating the PD2DSCH in the D2DSS resource.

Also, there is a need of a rule for the UE to processing the SA and data transmissions in the case that there is no data to transmit through D2D communication.

Figure 5:
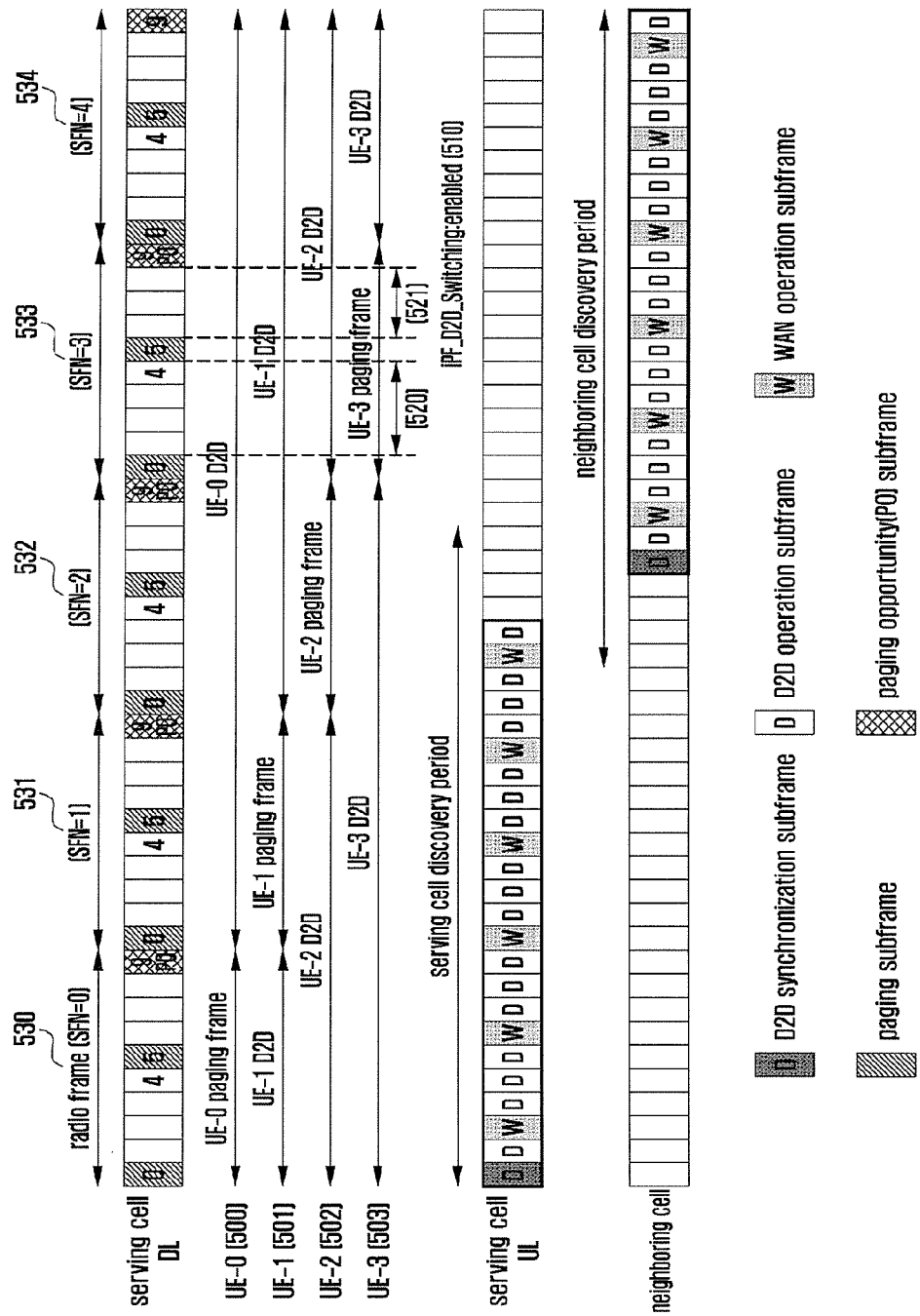
FIG. 5 is a diagram illustrating D2D/WAN switching timing of the RRC_Idle UE according to an embodiment of the present invention.

FIG. 5 is a diagram illustrating D2D/WAN switching timing of the RRC_Idle UE according to an embodiment of the present invention. As shown in FIG. 5, since the paging frames of the UE-0 500, UE-1 501, and UE-2 502 are overlapped with the discovery period, each UE switches from the D2D operation to the WAN operation in its paging frame. In detail, the radio frame 530 with SFN=0 is the paging frame of the UE-0 500, the UE-0 500 performs the WAN operation in the radio frame 530 with SFN=0 and the D2D operation in other radio frames. Likewise, the UE-1 501 performs the WAN operation in the radio frame 531 with SFN=1 (which is the paging frame of the UE-1 501) and the D2D operation in other radio frames. In the case of the UE-3 503, if the iPF_D2D_Switching is activated as denoted by reference number 510, it can switch from the WAN operation to the D2D operation at the subframes 1 to 4 as denoted by reference number 520 and subframes 6 to 8 as denoted by reference number 521 at which no paging signal is transmitted in the paging frame. If the UE detects the paging message addressed to it, it continues performing WAN operation such as RRC connection request other than switching to the D2D operation.

Also, the D2D UE can use a fixed PO subframe. For example, the D2D UE can always use subframe 4 as the PO subframe. This method can increase the time for D2D operation a little and decrease the frequency bandwidth necessary for switching when the iPF_D2D_Switching is activated.

Figure 6:
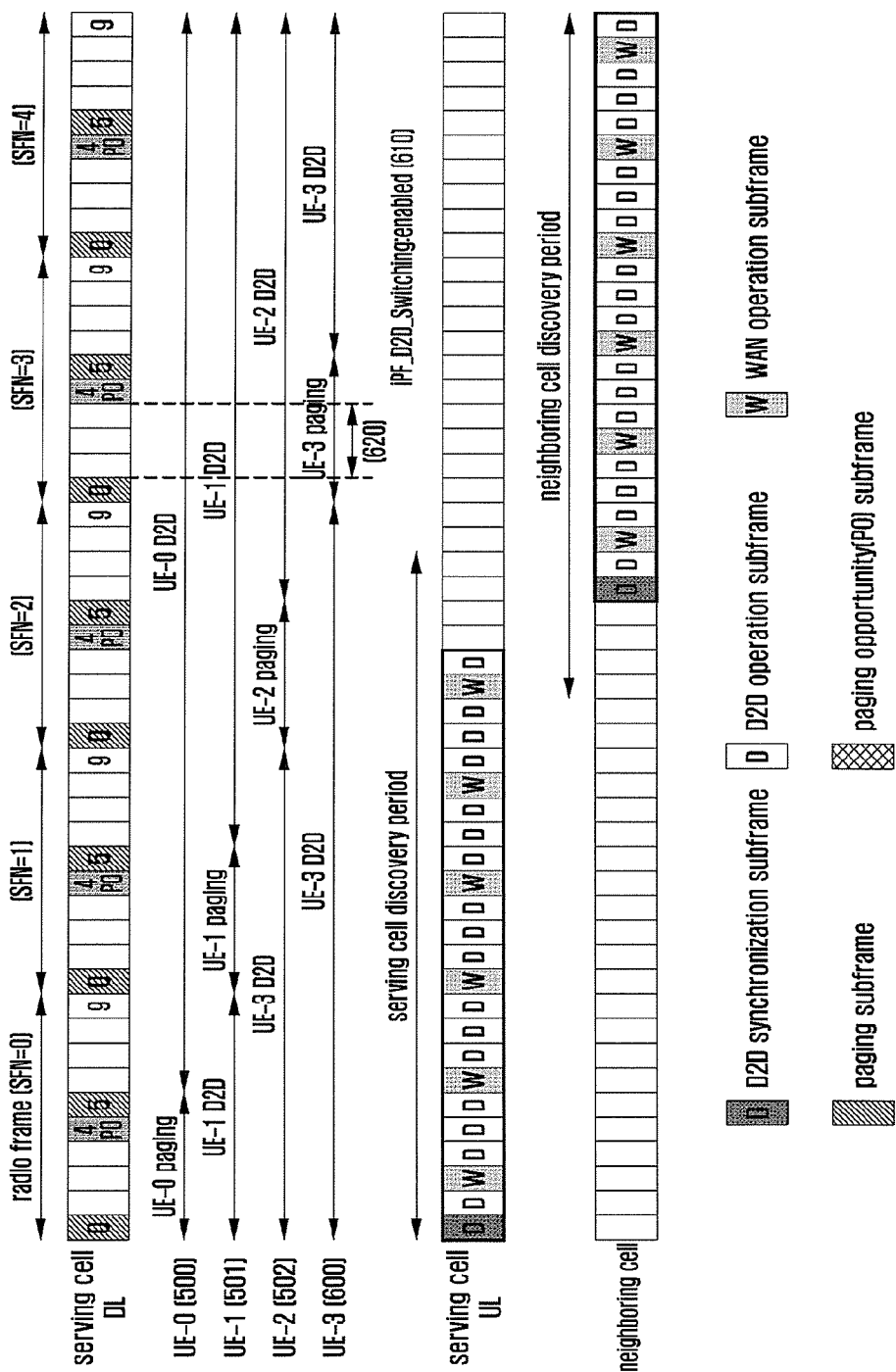
FIG. 6 is a diagram illustrating D2D/WAN switching timing of the RRC_Idle UE according to another embodiment of the present invention.

FIG. 6 is a diagram illustrating D2D/WAN switching timing of the RRC_Idle UE according to another embodiment of the present invention. According to FIG. 6, the subframe 4 of the paging frame is fixedly used as the PO subframe. At this time, the UE-3 600 for which the iPF_D2D_Switching is activated as denoted by reference number 610 can switch from the WAN to the D2D operation at the subframes 1 to 3 having no paging signal in its paging frame as denoted by reference number 620.

Also, if there is probability of overlap between the PO subframe and the D2D synchronization subframes of the neighboring cells, there is a need of additional rules for D2D/WAN switching.

Figure 7:
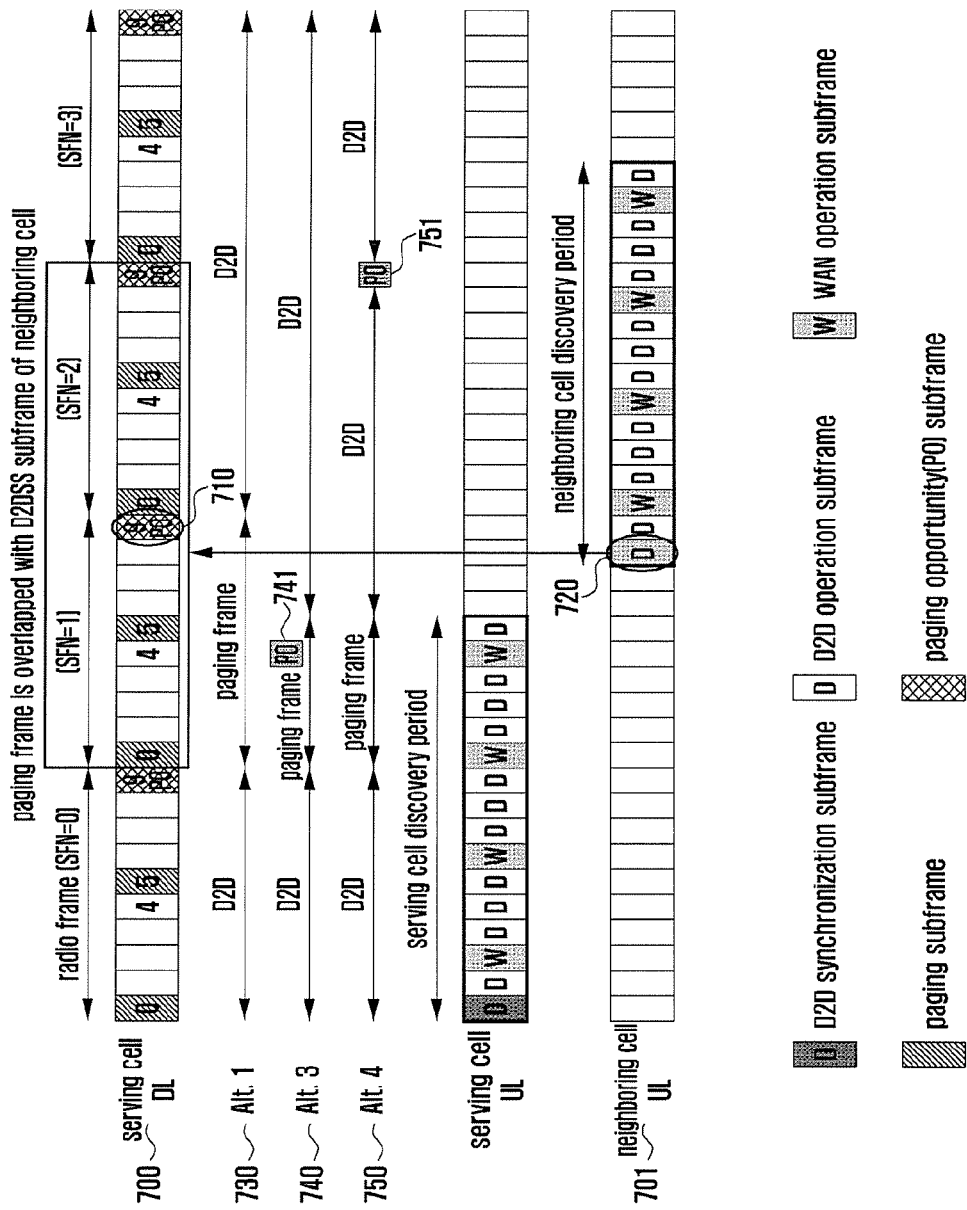
FIG. 7 is a diagram illustrating a situation where the PO of the serving cell and the D2DSS of the neighboring cell collide with each other.

FIG. 7 is a diagram illustrating a situation where the PO of the serving cell and the D2DSS of the neighboring cell collide with each other. Referring to FIG. 7, the PO subframe of the serving cell 700 of the UE is the subframe 9 710 of the radio subframe with SFN=1, and it is overlapped with the D2D synchronization subframe 720 of the neighboring cell 701. If the UE fails to acquire synchronization of discovery pool with the neighboring cell due to no receipt of the synchronization frame of the neighboring cell, the UE cannot receive the discovery message in the whole discovery period of the neighboring cell. In order to solve this problem, a few rules can be specified. First, the PO subframe always has a high priority. That is, the UE does not perform D2D synchronization and inter-cell discovery in the PO subframe. Second, the eNB provides the UE with a new paging parameter (e.g. DRX cycle) to avoid the above collision. Third, the eNB configures the PO subframe one more to transmit the paging message. Fourth, the eNB reconfigures the PO subframe in the next radio frame of the paging frame in which collision has occurred (i.e. frame having the SFN acquired by adding 1 to the SFN of the paging subframe).

These rules are described with reference to FIG. 7. First, in Alt. 1 730 for the method in which the PO subframe always has the high priority, the UE receives the subframe 9 710 of the radio frame with SFN=1 as the PO subframe and ignores the synchronization subframe carrying the D2DSS of the neighboring cell 701 and the inter-cell discovery. Second, in the Alt. 3 740 for the method of configuring the PO subframe one more time, the UE receives the paging message in the subframe 4 741 of the radio frame with SFN=1 and ignores the PO subframe 710 which is overlapped with the synchronization subframe 720 of the neighboring cell. Third, in Alt. 4 750 for reconfiguring the PO subframe in the radio frame following the paging frame, the eNB configures the subframe 9 751 of the radio frame with SFN=2, i.e. the next radio frame following the radio frame with SFN=1 in which the collision has occurred, as the PO subframe again. The UE receives the synchronization subframe 720 of the neighboring cell and the PO subframe 751 of the radio frame (with SNF=2) of the serving cell. In Alt. 3 740 and Alt. 4 750 of FIG. 7, there is the PO subframe repeating in the current radio frame (SFN=1) or the next radio frame (SFN=2) and thus it is guaranteed that the UE can receive the paging message in at least one subframe which is not overlapped with the D2D synchronization subframe of the neighboring cell.

A description is made of the D2D/WAN switching method of the UE in the RRC_Connected state (RRC_Connected UE) hereinafter.

The RRC_Connected UE can switch to the D2D operation during the subframes without ongoing WAN data transmission or reception. Only when there is ongoing WAN data transmission or reception, the UE has to switch to the WAN operation.

First, the UE can refer to the information on the arrangement of the subframes for D2D and WAN operations included in the system information. The subframe arrangement information can be provided in the form of a bitmap indicating whether the UE performs the D2D operation or the WAN operation at each subframe. Each bit of the bitmap can be set to 0 for indicating D2D operation or 1 for indicating WAN operation or vice versa. The UE can use a D2D switching timer for monitoring WAN PDCCH for data transmission before the D2D discovery period starts. If there is no ongoing WAN data before the start of the discovery period, the UE can switch to the D2D operation upon the start of the D2D discovery period. If there is ongoing WAN data, the UE processes the ongoing WAN data transmission/reception with priority. During the D2D discovery period, the UE switches to the WAN operation to monitor the PDCCH in the WAN subframe indicated by the system information. If there are no ongoing data as the result of the PDCCH monitoring, the UE switches to the D2D operation back. If there is a need of data transmission/reception as the result of the PDCCH monitoring, the UE continues the WAN operation until the WAN data transmission/reception ends. For this purpose, a timer for switching to the D2D operation back is used after the ongoing WAN data transmission/reception is completed.

Figure 8:
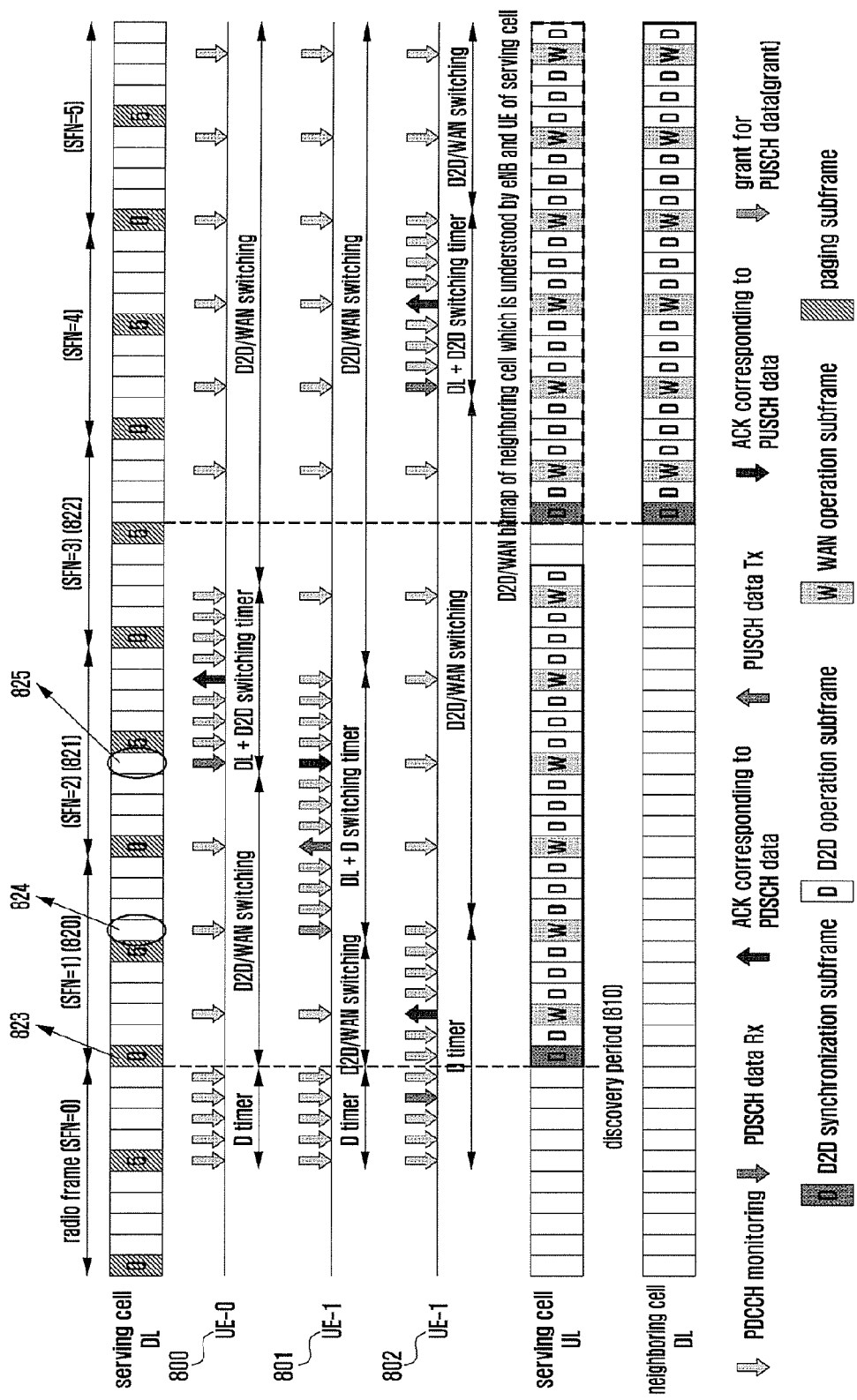
FIG. 8 is a diagram illustrating a D2D/WAN switching operation of an RRC_Connected UE according to an embodiment of the present invention.

FIG. 8 is a diagram illustrating a D2D/WAN switching operation of an RRC_Connected UE according to an embodiment of the present invention. Referring to FIG. 8, the UE-0 800, UE-1 801, and UE-2 802 use the D2D/WAN subframe arrangement information included in the system information. In detail, the UE-0 800 performs D2D operation since subframe 0 823 of the radio frame 820 with SFN=1 from which the discovery period 810 starts in the serving cell. The UE-1 801 also operates in the same way, but the UE-2 802 continues WAN operation for processing the ongoing WAN data in the subframe 0 823 from which the discovery period 810 starts, other than switching to the D2D operation. In the case of the UE-0 800, since there is the uplink grant for Physical Uplink Shared Channel (PUSCH) in the subframe 6 824 of the radio frame with SFN=1 which includes indication of instructing the UE to perform WAN operation, the UE continues the WAN operation for the duration of the D2D switching timer since then and, if the timer expires, the UE switches to the D2D operation when the timer expires. In the case of the UE-1 801, since there is Physical Downlink Shared Channel (PDSCH) in the subframe 4 825 of the radio frame 821 with SFN=2 which includes indication of instructing the UE to perform WAN operation, the UE continue WAN operation for the duration of the D2D switching timer and, if the timer expires, the UE switches back to the D2D operation.

This method has no problem in the case of considering the serving cell, but it can be difficult to process some cases considering the neighboring cells. For example, if the discovery periods of the plural neighboring cells are overlapped, the D2D/WAN arrangements for the neighboring cells mismatch each other and thus the UE faces a problem of determining the operation to take.

During the discovery period of the neighboring cell, a predetermined D2D/WAN switching rule can be applied to the UE. The RRC_Connected UE can operate in the DRX mode so as to switch to the D2D discovery operation in the DRX sleep state. This operation can be configured as default operation and, if the discovery period is overlapped with the DRX cycle, the system parameter cDRX_D2D_Enabled can be used to indicate the UE to perform the DRX operation in the DRX cycle. There can be a need of additional rules to perform the WAN/D2D switching appropriately in the DRX cycle.

Figure 9:
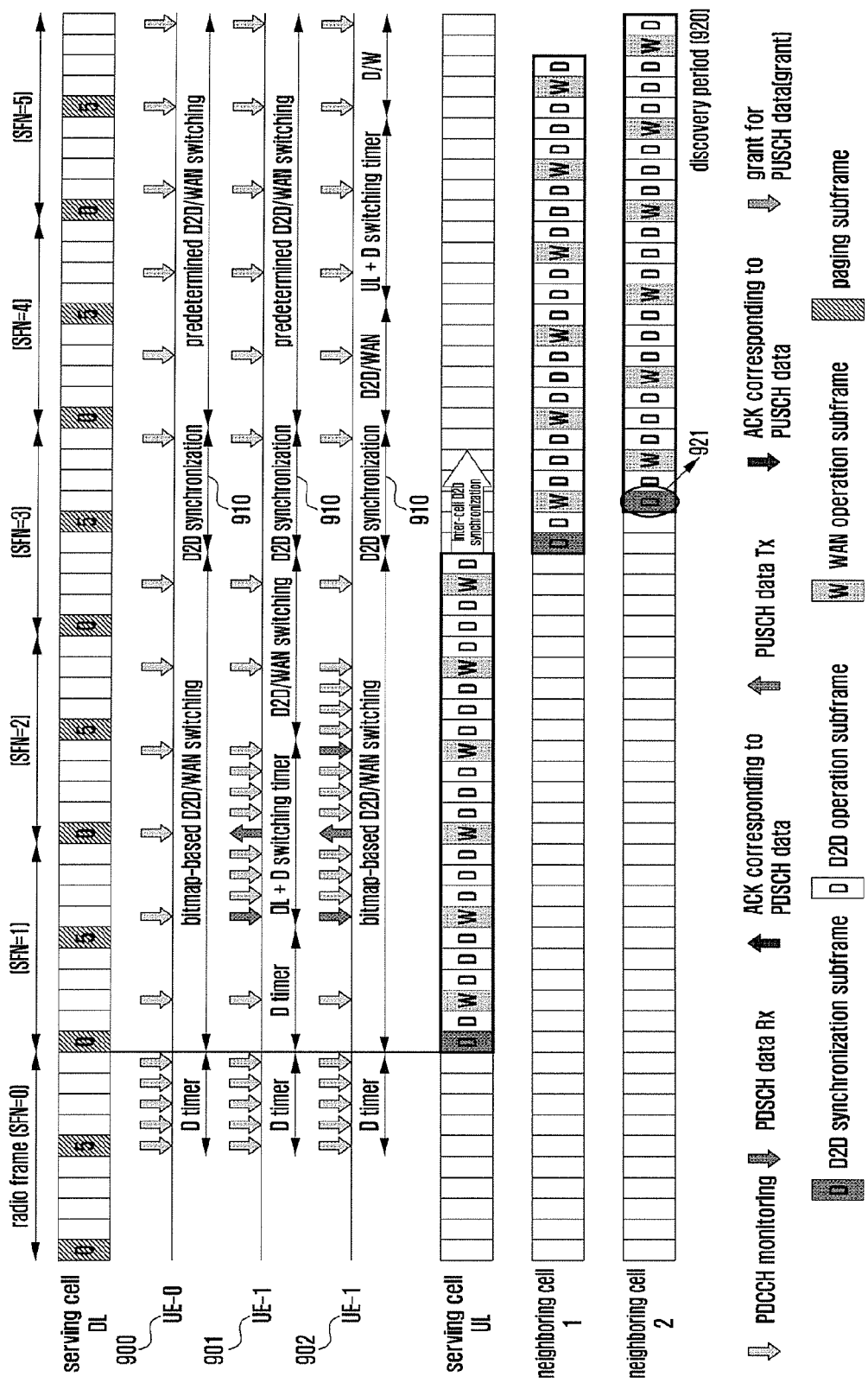
FIG. 9 is a diagram illustrating a D2D/WAN switching operation of the RRC_Connected UE according to another embodiment of the present invention.

FIG. 9 is a diagram illustrating a D2D/WAN switching operation of the RRC_Connected UE according to another embodiment of the present invention. Referring to FIG. 9, it can be possible to define a predetermined continuation period 910 to allow continuous D2D synchronization operation when the D2D synchronization subframe 921 of the neighboring cell 2 draws near. At this time, the UE-0 900, UE-1 901, and UE-2 902 acquire synchronization with the neighboring cell 2 and perform a predetermined D2D/WAN switching operation during the discovery period 920 of the neighboring cell 2.

Figure 10:
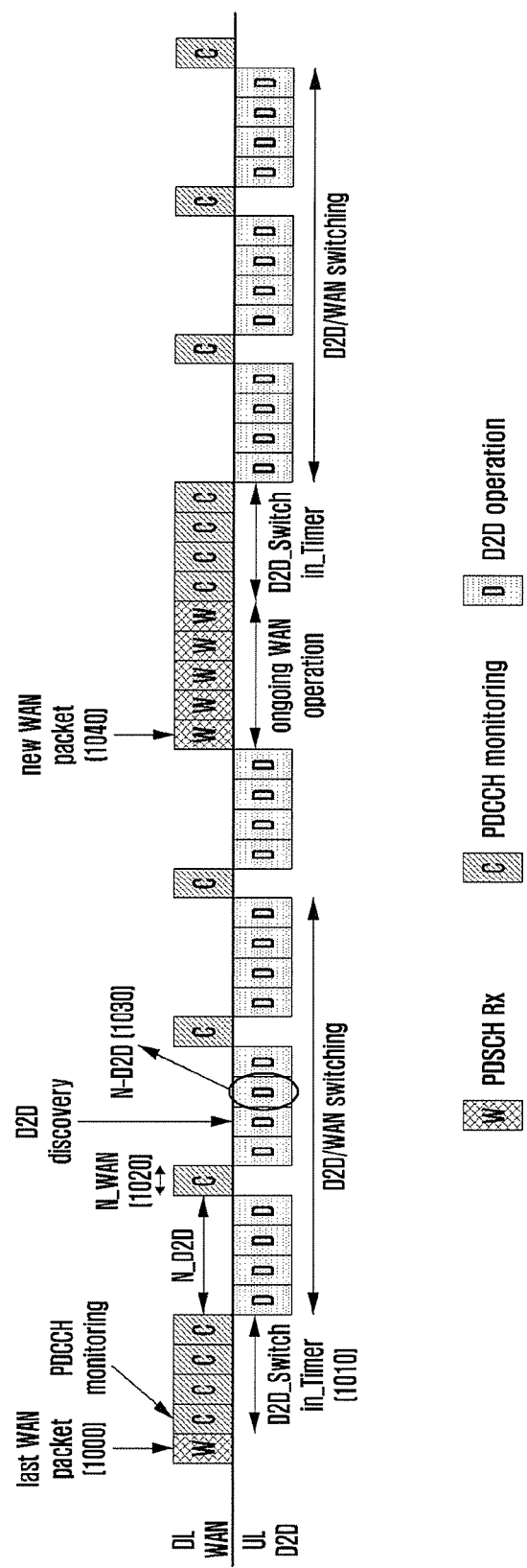
FIG. 10 is a diagram illustrating a D2D/WAN switching operation according to an embodiment of the present invention.

The eNB can send the UE the parameters related to the D2D/WAN switching operation. FIG. 10 is a diagram illustrating a D2D/WAN switching operation according to an embodiment of the present invention. Referring to FIG. 10, the parameter D2D_Switching_Timer is used to control the switching from the WAN operation to the D2D operation. At the end of the last WAN packet 1000 (e.g. data transmission/reception), the D2D_Switching_Timer 101 starts and, if no new WAN operation resource allocation information is received until the D2D_Switching_Timer expires, the UE switches to the D2D operation. Afterward, the UE switches between the N_WAN subframe 1020 for WAN PDCCH monitoring and the N_D2D subframe 1030 for D2D operation during a predetermined period. If the UE receives the resource allocation information through PDCCH monitoring as denoted by reference number 1040, it has to process the WAN operation with priority. After the WAN operation, the D2D/WAN switching mode starts over.

It can be possible to use an explicit command-based switching along with the timer-based switching. If it is sure that the eNB has no more data for the UE or if there are no data to schedule for the UE for a long time, the eNB can send the UE the parameter D2D_Switching_Command explicitly. If the D2D_Switching_Command is received, the UE switches from the WAN operation to the D2D operation immediately. This parameter can be transmitted through higher layer signaling or physical layer control information from the eNB to the UE.

Figure 11:
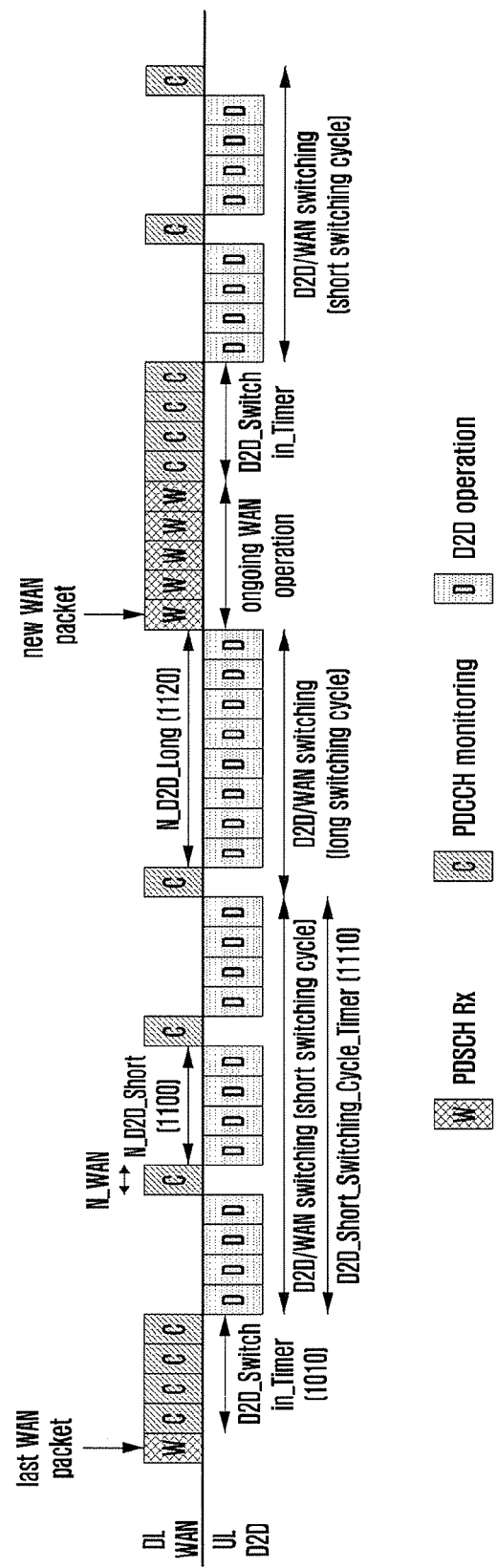
FIG. 11 is a diagram illustrating a UE operation of using a plurality of D2D/WAN switching cycles according to an embodiment of the present invention.

It can also be possible to apply a plurality of D2D/WAN switching cycles to the UE. FIG. 11 is a diagram illustrating a UE operation of using a plurality of D2D/WAN switching cycles according to an embodiment of the present invention. Referring to FIG. 11, a short switching cycle (N_D2D_Short sub-frame) and a long switching cycle (N_D2D_Long sub-frame) can be applied. If the UE enters the switching mode, the N_D2D_Short sub-frame 1100 as the short switching cycle is applied. The UE performs switching to the WAN operation according to the N_D2D_Short sub-frame 1100. If new WAN resource allocation information is not received until the D2D_Short_Switching_Cycle_Timer expires since the N_D2D_Short 1100 has applied, the UE enters the D2D/WAN switching mode of the long switching cycle N_D2D_Long sub-frame 1120. If the UE receives resource allocation information through the WAN PDCCH monitoring and the D2D_Switch_Timer expires such that the WAN operation ends, the UE enters the short cycle D2D/WAN switching mode again.

All of the aforementioned switching parameters can be configured in adaptation to the network environment, UE preference, application scenario, etc.

Figure 12:
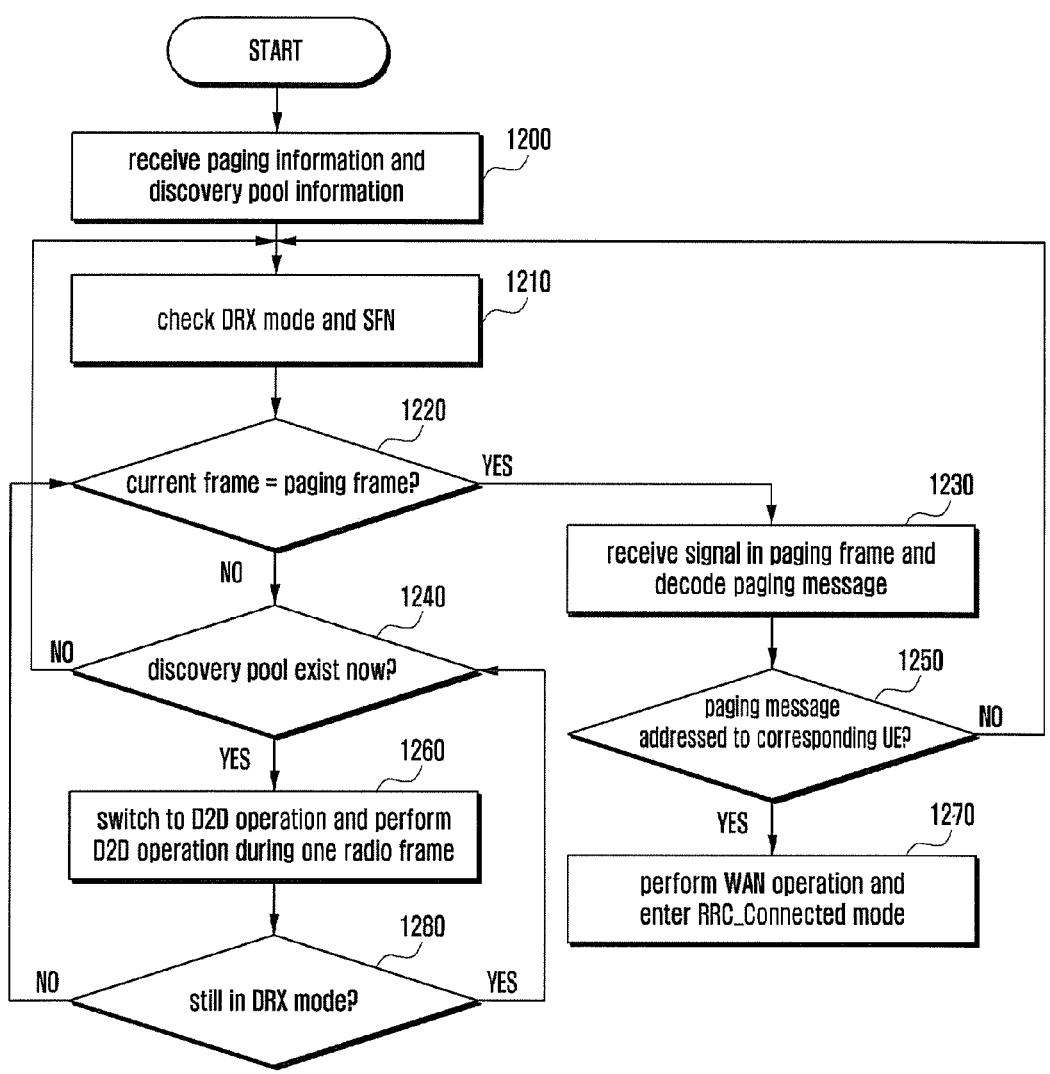
FIG. 12 is a flowchart illustrating an operation of an RRC_Idle UE according to an embodiment of the present invention.

FIG. 12 is a flowchart illustrating an operation of an RRC_Idle UE according to an embodiment of the present invention. Referring to FIG. 12, the UE receives paging information and discovery pool information from the eNB at step 1200. The paging information includes a DRX cycle, a paging frame index and a PO index. The UE checks the DRX mode and SFN applied to it at step 1210. The UE determines whether the current frame is the paging frame at step 1220 and, if the current frame is not the paging frame, determines whether a discovery pool exists currently at step 1240. If no discovery pool exists, the UE checks the DRX mode and SFN at step 1210 and, otherwise if the discovery pool exists, switches to the D2D discovery operation to perform the D2D operation during the one radio frame at step 1260. After completing the D2D operation, the UE determines whether it is still operating in the WAN DRX mode at step 1280 and, if so, returns the procedure to step 1240 to determine whether the discovery pool exists currently and, otherwise, returns the procedure to step 1220 to determine whether the current frame is the paging frame.

If the current frame is the paging frame at step 1220, the UE receives the signal in the paging frame and decodes the paging message at step 1230. The UE determines whether there is a message addressed to it in the received paging message at step 1250 and, if there is no message addressed to it, returns the procedure to step 1210 to check the DRX mode and SFN and, otherwise if there is a message addressed to it, performs the WAN operation and enters the RRC_Connected mode according to the content of the paging message at step 1270.

Figure 13:
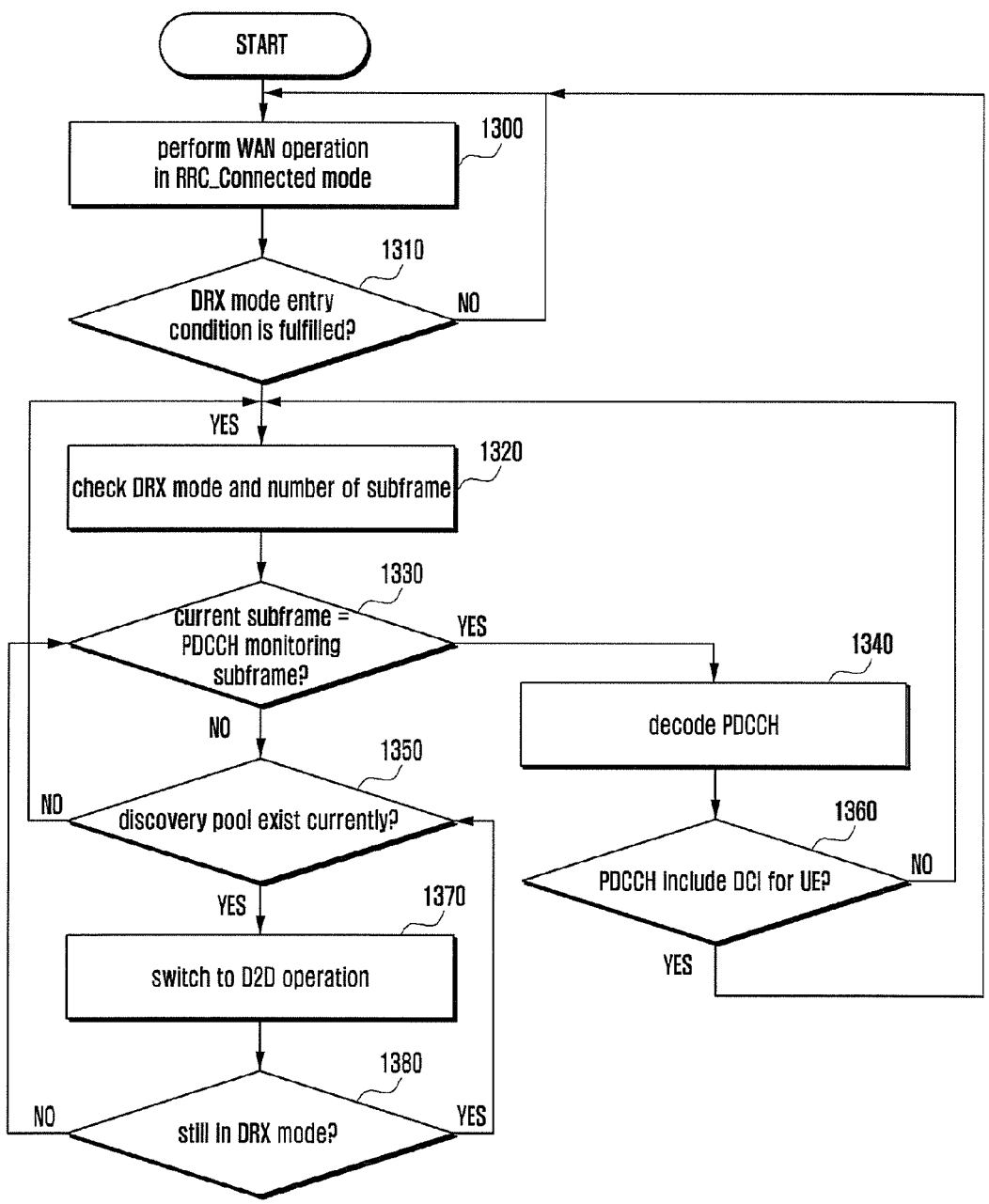
FIG. 13 is a flowchart illustrating an operation of the RRC_Connected UE according to an embodiment of the present invention.

FIG. 13 is a flowchart illustrating an operation of the RRC_Connected UE according to an embodiment of the present invention. Referring to FIG. 13, the UE performs the WAN operation in the RRC_Connected mode at step 1300. The UE determines whether a DRX mode entry condition is fulfilled at step 1310. If the DRX mode entry condition is not fulfilled, the UE performs the WAN operation in the RRC_Connected mode and, otherwise if the DRX mode entry condition is fulfilled, checks the DRX mode and the number of subframes at step 1320. The UE determines whether the current subframe is a PDCCH-monitoring subframe at step 1330 and, if the current subframe is not a PDCCH-monitoring subframe, determines whether the discovery pool exists currently at step 1350. If the discovery pool does not exist, the UE returns the procedure to step 1320 to check the DRX mode and the number of subframe again and, otherwise if the discovery pool exists, switches to the D2D operation to perform the D2D discovery operation during one subframe at step 1370. Next, the UE determines whether it is still operating in the DRX mode at step 1380 and, if so, returns the procedure to step 1350 to determine whether the discovery pool exists currently.

If the current subframe is the PDCCH-monitoring subframe at step 1330, the UE decodes PDCCH at step 1340. Next, the UE determines whether the PDCCH includes the downlink control information (DCI) at step 1360 and, if so, returns the procedure to step 1300 to perform the WAN operation in the RRC_Connected mode and, otherwise, returns the procedure to step 1320 to check the DRX mode and the number of subframes.

A description is made of the D2D priority and UE operation in the case that the D2DSS transmission resource is overlapped with the SA pool, data pool or discovery pool according to the second embodiment hereinafter.

Figure 14:
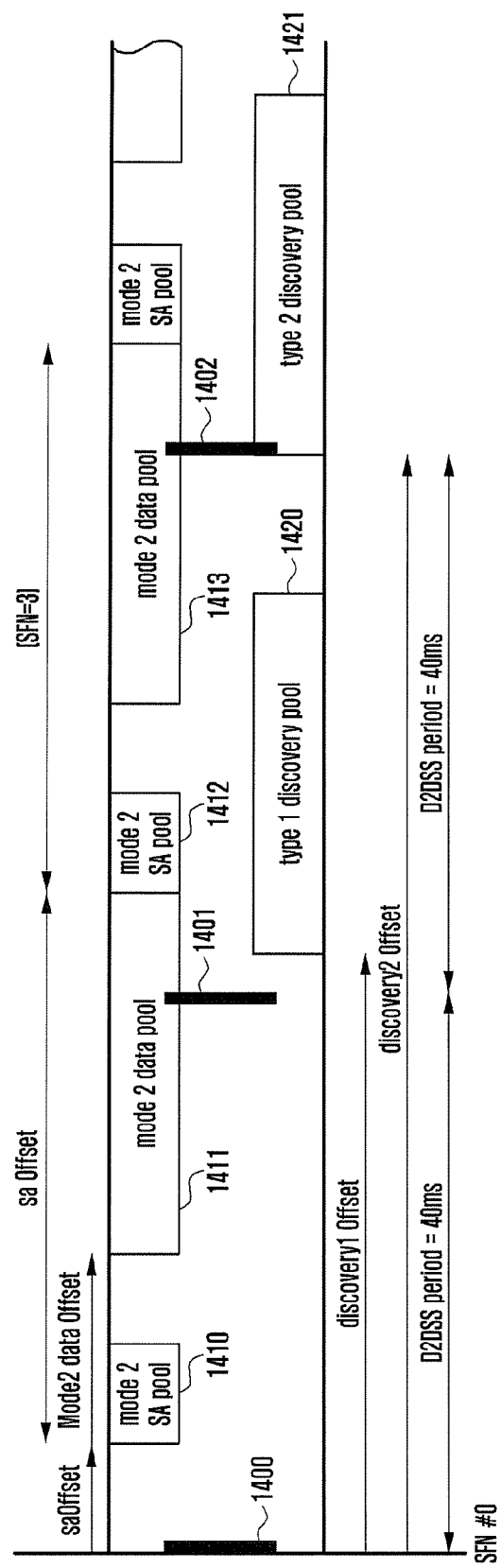
FIG. 14 is a diagram illustrating an exemplary situation where the D2DSS resource and D2D pool are overlapped.

FIG. 14 is a diagram illustrating an exemplary situation where the D2DSS resource and D2D pool are overlapped. Referring to FIG. 14, the D2DSS resources 1400, 1401, and 1402 appear at an interval of 40 ms, and each D2DSS resource occupies one subframe on the time axis and 6 central RBs on the frequency axis. When the D2DSS resource and SA pools 1410 and 1412 and the data pools 1411 and 1413 and the discovery pools 1420 and 1421 coexist, the D2DSS resource can be overlapped with the data pool 1411 and discovery pool 1421.

Figure 15:
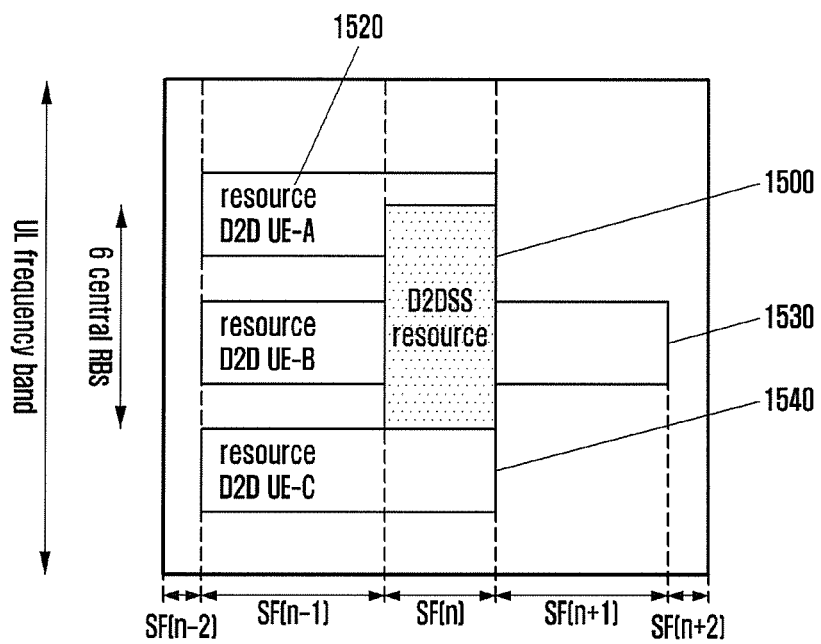
FIG. 15 is a diagram illustrating an exemplary situation where the D2DSS resource and D2D pool are overlapped in more detail.

FIG. 15 is a diagram illustrating an exemplary situation where the D2DSS resource and D2D pool are overlapped in more detail. Referring to FIG. 15, the subframe n 1500 belongs to the D2D discovery resource pool on the time axis, and the frequency resource is allocated to three UEs, i.e. UE-A, UE-B, and UE-C. At this time, it is configured that the D2DSS resource 1510 is positioned in the subframe n 1500 and occupies 6 central RBs, and thus if one or more UEs are triggered to transmit the D2DSS in this D2DSS resource, the D2D discovery resource pools 1520 and 1530 of the UE-A and UE-B are overlapped with the D2DSS resource. In the case of the UE-B, the resource 1530 allocated to the UE-B is wholly overlapped with the D2DSS resource 1500. In the case of the UE-A, the resource 1520 allocated to the UE-A is partially overlapped with the D2DSS resource 1500. In the case of the UE-C, the resource 1540 allocated to the UE-C is not overlapped with the D2DSS resource 1500.

Depending on whether the UE is triggered to transmit the D2DSS in the D2DSS resource overlapped with the resource allocated to it, the UE operation and priority rule can change.

Basically, the UE triggered to transmit the D2DSS at subframe n always has to transmit the D2DSS. This means that if the data transmission resource is overlapped with the D2DSS resource and D2D transmission is triggered, the D2DSS transmission is performed with priority in comparison to the D2D data transmission. Concerning the example of FIG. 4, if the UE-A, UE-B, and UE-C are triggered to transmit the D2DSS, they have to transmit the D2DSS but no data in subframe n.

To the UE triggered to transmit the D2DSS in the overlapped resource, two methods can be applied as follows. First, the D2DSS resource always has a higher priority determined at the system level (Alt. 1). That is, the UE always transmit the D2DSS with priority as compared to all other data transmission. This method can be categorized into two methods depending on whether the data transmission is allowed to be performed in other RBs than the 6 central RBs.

For example, the RBs, with the exception of the 6 central RBs, also cannot be used for data transmission of all other UEs. Also, the predetermined number of RBs among the RBs arranged at both sides of the 6 central RBs is reserved for use of guard bands so as not to be used for data transmission of the other UEs. In the example of FIG. 4, although the UE-A, UE-B, and UE-C are not triggered to transmit the D2DSS, they cannot transmit data at subframe n (Alt. 1-1).

In another embodiment, the RBs, with the exception of the 6 central RBs, are allowed for UEs by the UEs which do not transmit D2DSS. In the example of FIG. 4, if the UE-C is not triggered for D2DSS transmission, it can transmit data instead. The UE-B cannot transmit data regardless of whether it is triggered for D2DSS transmission (Alt. 1-2).

Second, if the UE which has not been triggered for D2DSS transmission is scheduled for data transmission in the subframe of the data transmission resource overlapped with the D2DSS resource, the data transmission is allowed. In the example of FIG. 4, if the UE-A is triggered for D2DSS transmission and if the UE-B is not triggered for D2DSS transmission but scheduled for data transmission, the UE can transmit data in its data transmission resource 1530.

In summary, if D2D transmission is instructed by the eNB or triggered according to a predetermined condition, the corresponding UE always has to transmit the D2DSS. The UE which transmits the D2DSS gives up other data transmission in the D2DSS resource subframe.

In the case that the UE which does not transmit D2DSS is scheduled for data transmission, the UE can transmit data or not. For example, the system can configure the following rules. First, the RBs of the subframe having D2D resource (hereinafter, referred to as D2DSS resource subframe) are not allowed for other data transmission (rule 1). Second, only the RBs with the exception of the 6 central RBs of the D2DSS resource subframe can be used for other data transmission (rule 2). Third, all of the RBs of the D2DSS resource subframe are allowed for other data transmission (rule 3).

In the case that the UE which does not transmit D2DSS is scheduled for data transmission, the UE can be configured to transmit data in one of two or more methods, and this configuration can be done through signaling from the eNB. For example, it is possible to notify the UE of the priority rule to be applied using a 1-bit indicator included in a System Information Block (SIB). The UE can configure priority using one of rule 1 and rule 2 (e.g. 0: No RB is allowed for data transmission, 1: RBs except for the 6 central RBs are allowed for data transmission) (Alt. 1) or using one of rule 2 and rule 3 (e.g. 0: RBs except for the 6 central RBs are allowed for data transmission, 1: All RBs are allowed for data transmission) (Alt. 2).

Such priority rules can be shared commonly by the multiple UEs located in a cell. That is, all UEs located in the same cell can have the same priority rule. Also, the priority rules can be applied to the UEs belonging to one pool commonly. In this case, the priority rule can be signaled from the eNB to the UE on per-pool basis. Also, the priority rule can be signaled per UE such that the UEs can have UE-specific priority rules.

A description is made of the rule of transmitting PD2DSCH depending on the type of UE for decoding PD2DSCH successfully according to the third embodiment.

In the case that the D2DSS transmission is triggered in the D2DSS resource according to the fulfillment of a predetermined condition or instructed by the eNB, the communication UE (C-UE) and discovery UE(D-UE) have to transmit the D2DSS in the D2DSS resource. Also, if PD2DSCH transmission is required, it can be transmitted along with the D2DSS selectively. For example, the PD2DSCH can be transmitted by the C-UEs for delivering the control information to the neighboring UEs including the UEs located in the neighboring cells and out of coverage. The Reception (Rx) UE has to decode the D2DSS to acquire synchronization and the PD2DSCH to acquire control information.

Figure 16:
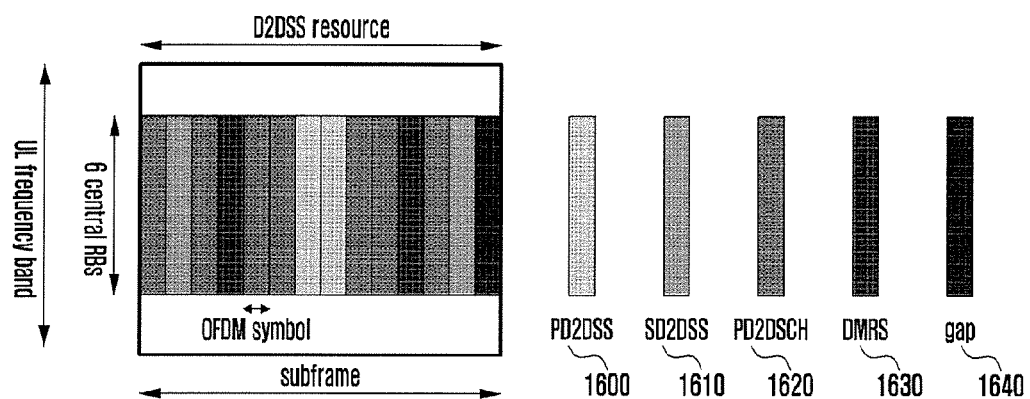
FIG. 16 is a diagram illustrating the use of OFDM symbols in the D2DSS resource according to an embodiment of the present invention.

FIG. 16 is a diagram illustrating the use of OFDM symbols in the D2DSS resource according to an embodiment of the present invention. Referring to FIG. 16, a subframe includes two symbols for PD2DSS 1600, two symbols for SD2DSS 1610, and the last symbol for gap 1640. Among the rest symbols, two symbols can be used for transmitting Demodulation Reference Signal (DMRS) 1630, and the remained symbols can be used for transmitting PD2DSCH 1620.

In the case of the PD2DSCH transmission, each UE can transmit the PD2DSCH according to the following methods in order for the Rx UE to decode the PD2DSCH successfully.

First, the C-UE and D-UE always transmit both the D2DSS and PD2DSCH. The DMRS can be transmitted selectively. In the case of not using the DMRS, the DMRS symbols can be used for PD2DSCH data transmission. The D2DSS can be used for channel estimation and PD2DSCH demodulation (Alt. 1). Second, the C-UE always transmits both the D2DSS and PD2DSCH, and the D-UE transmits only the D2DSS. In this case, if the C-UE and D-UE transmit the D2DSS (and PD2DSCH for the C-UE) in the same subframe, they can experience different channels and thus the channel estimated with the D2DSS cannot be used for demodulating the PD2DSCH. Accordingly, the C-UE transmitting the PD2DSCH always has to transmit the DMRS too for channel estimation and PD2DSCH demodulation. Since the D-UE does not transmit PD2DSCH, it does not transmit DMRS too. The C-UE and D-UE transmit different D2DSSs. For example, the C-UE transmits C-D2DSS, and the D-UE transmits D-D2DSS. In the case that the C-UE transmits the PD2DSCH, it is possible to use the DMRS selectively along with DMRS. In the case that no DMRS is transmitted, the C-D2DSS can be used for channel estimation and PD2DSCH demodulation.

A description is made of the UE operation in the case that there are no data to be transmitted to another UE according to the fourth embodiment.

In mode 1 communication, the eNB sends the UE a D2D grant indicating the SA and data resources allocated to the UE and including the information such as Physical Resource Block (PRB) index, frequency hopping rule, time-resource pattern for transmission (T-RPT). The UE transmits the SA in the mode 1 SA pool after receiving the D2D grant. The SA has to inform of the target receiver ID, PRB index of the resource for use in data transmission, frequency hopping rule, and T-RPT.

Typically, one MAC PDU is transmitted repeatedly as much as the predetermined number of times (e.g. 4 times) in the data resource. According to the allocated resource amount, one or more MAC PDUs can be transmitted.

Figure 17:
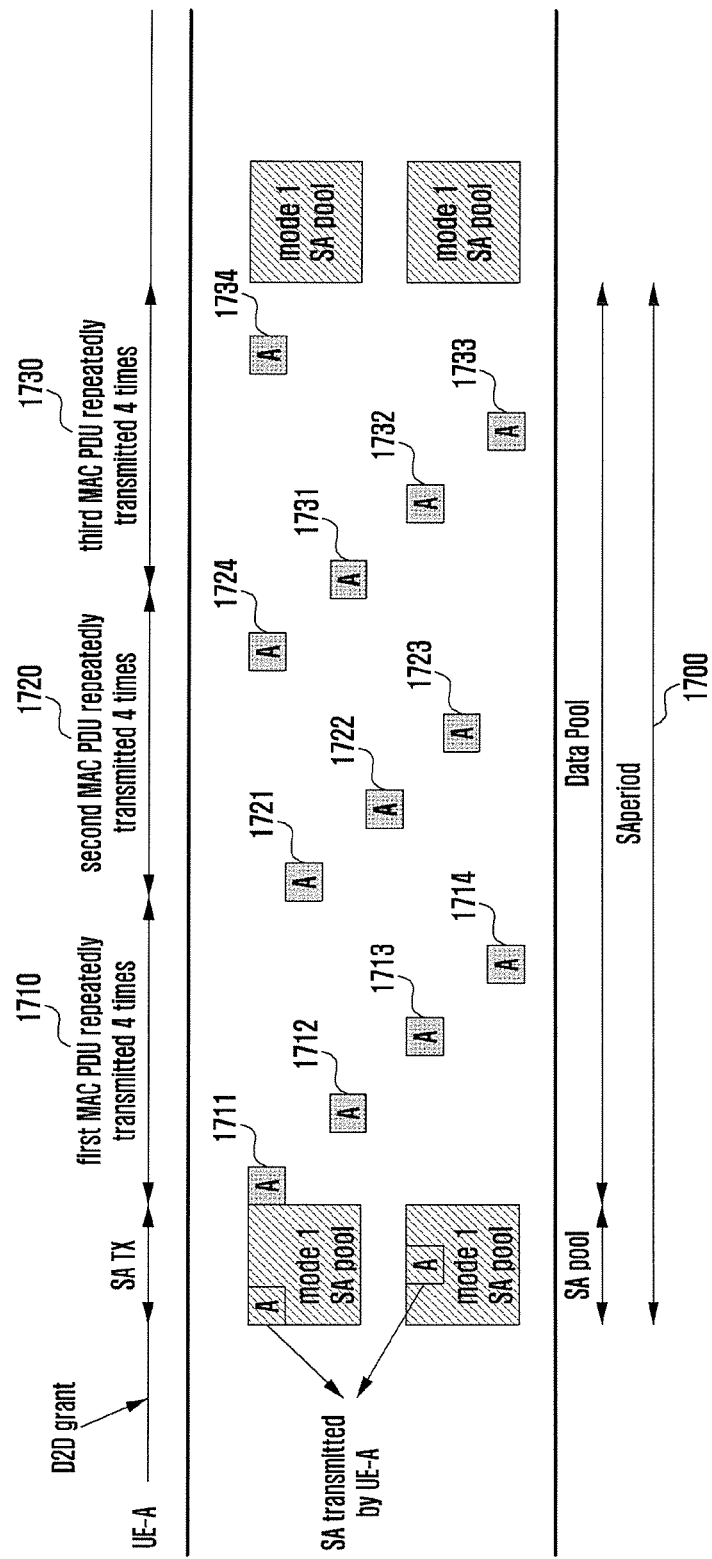
FIG. 17 is a diagram illustrating a SA and data transmission operation of a UE in mode 1 communication according to an embodiment of the present invention.

FIG. 17 is a diagram illustrating a SA and data transmission operation of a UE in mode 1 communication according to an embodiment of the present invention. Referring to FIG. 17, the UE transmits three MAC PDUs 1710, 1720, and 1730 in the T-RPT subframe allocated during one scheduling period (saPeriod) 1700, each MAC PDU being transmitted 4 times (the first MAC PDU 1710 as denoted by reference numbers 1711, 1712, 1713, and 1714; the second MAC PDU 1720 as dented by reference numbers 1721, 1722, 1723, and 1724; and the third MAC PDU 1730 as denoted by reference numbers 1731, 1732, 1733, and 1734). The target Rx UE decodes the SA and then receives the data in the T-RPT subframe allocated to it.

If a Tx UE has no data to transmit when it transmits the SA although the Tx UE has received a D2D grant from the eNB, it performs the following operations. First, the UE does not transmit the SA (Alt. 1). Second, the UE transmit the SA but no data. If new data to be transmitted to the Rx UE arrive, the UE transmits the data using the resource available after the new data arrive among the resources configured for the respective MAC PDUs (Alt. 2). Third, the UE can select one of Alt. 1 and Alt. 2 (Alt. 3). Fourth, the UE transmits the SA and uses a resource release mechanism for handling the situation with data to transmit (Alt. 4).

In Alt. 1, the UE does not transmit the SA and cannot use the data resource during one saPeriod. This means that the UE gives up the opportunity of data transmission during one saPeriod. In this case, if no new data arrive during the saPeriod, there is no influence to the Tx UE but, if new data occur during the saPeriod, the Tx UE has to wait for a new D2D grant to transmit the data and thus the data cannot be transmitted immediately in the current saPeriod. This may cause extra transmission delay.

In Alt. 2, the UE transmits the SA regardless of whether there are data to transmit when it transmits the SA. If there are no data to be transmitted in the data resource related to the SA transmitted during the saPeriod, the UE does not transmit MAC PDUs. Otherwise if new data arrive during the saPeriod, the UE can check whether the remained resource is available for transmitting one MAC PDU. If so, the UE can transmit the MAC PDU immediately in the next set of the data resource. This method is capable of reducing transmission delay as compared to Alt. 1.

Figure 18:
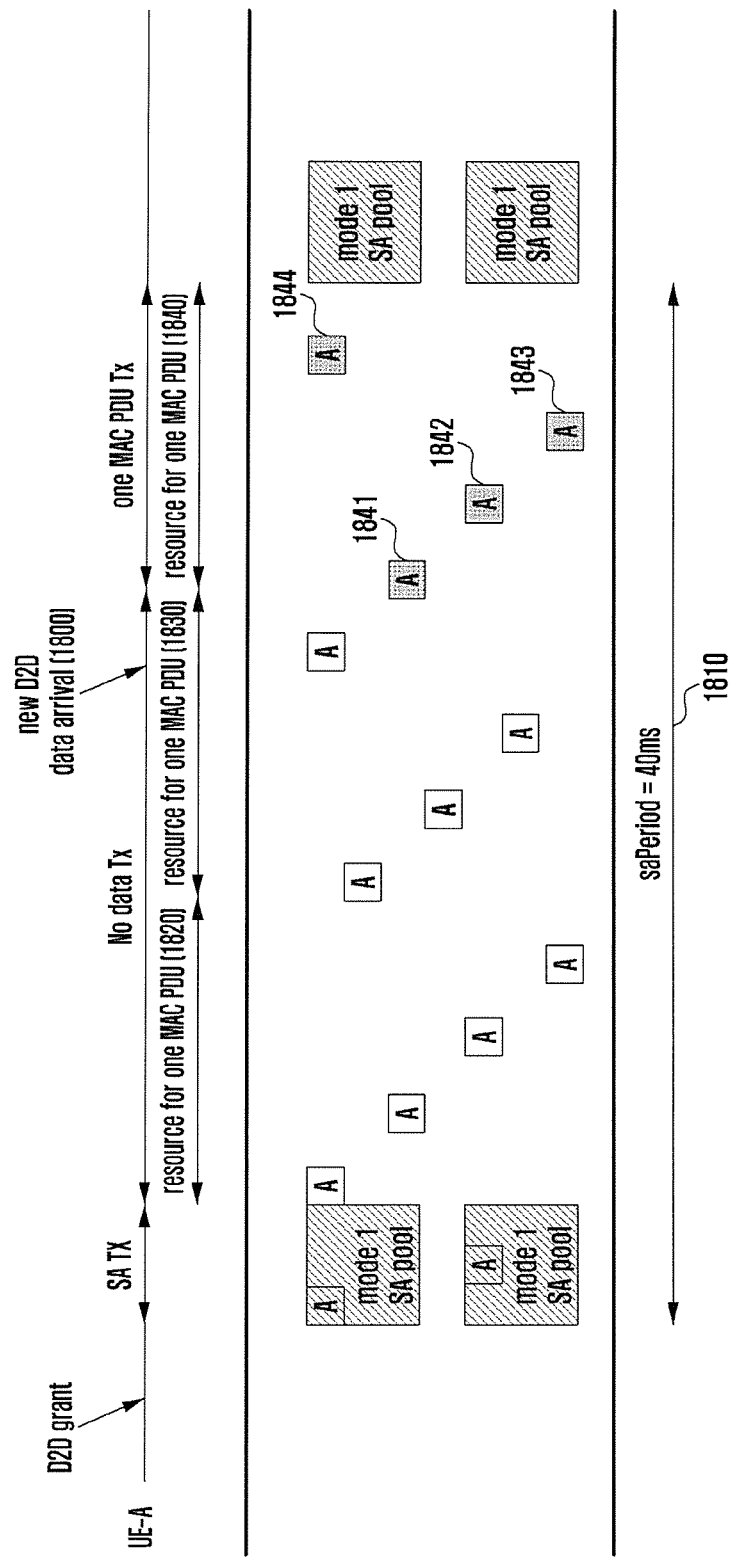
FIG. 18 is a diagram illustrating an SA and data transmission operation of the UE in Alt. 2 of mode 1 communication according to an embodiment of the present invention.

FIG. 18 is a diagram illustrating an SA and data transmission operation of the UE in Alt. 2 of mode 1 communication according to an embodiment of the present invention. Referring to FIG. 18, the Tx UE transmits the SA although there are no D2D data to transmit. During the period without data to transmit, the Tx UE does not transmit data in the reserved resources 1820 and 1830. At this time, if new data arrive r, the Tx UE determines whether it is possible to transmit one MAC PDU in the reserved resource remained. Since there is the resource 1840 capable of transmitting one MAC PDU, the UE transmits the newly arrived data to the Rx UE at the positions 1841, 1842, 1843, and 1844.

In Alt. 4, the UE transmits the SA regardless of whether there are data to transmit when it transmits the SA. At this time, the resource release mechanism can be considered to handle the situation without data to transmit. For example, the parameter ReleaseInterval can be interpreted as an interval for releasing the resource reservation for data transmission if there is no MAC PDU transmission during the corresponding interval. The ReleaseInterval can be defined by the number of T-RPT subframes allocated to the UE or the number of subframes counted in the data pool. If new data arrive at the Tx UE during the ReleaseInterval in on saPeriod, the UE can transmit a new MAC PDU. Otherwise if no new data arrive during the ReleaseInterval, the UE gives up the data transmission change and release the resource allocated in the current saPeriod. If the Rx UE cannot decode the MAC PDU in the ReleaseInterval successfully, it can assume that there is no data transmission from the Tx UE and thus the allocated resource is released. Accordingly, the Rx UE can stop the receipt of additional data in the current saPeriod. The Tx UE can release the allocated resource and report the resource release to the eNB. If the resource release message is received from the Tx UE, the eNB can reuse the resource allocated to the UE.

Figure 19:
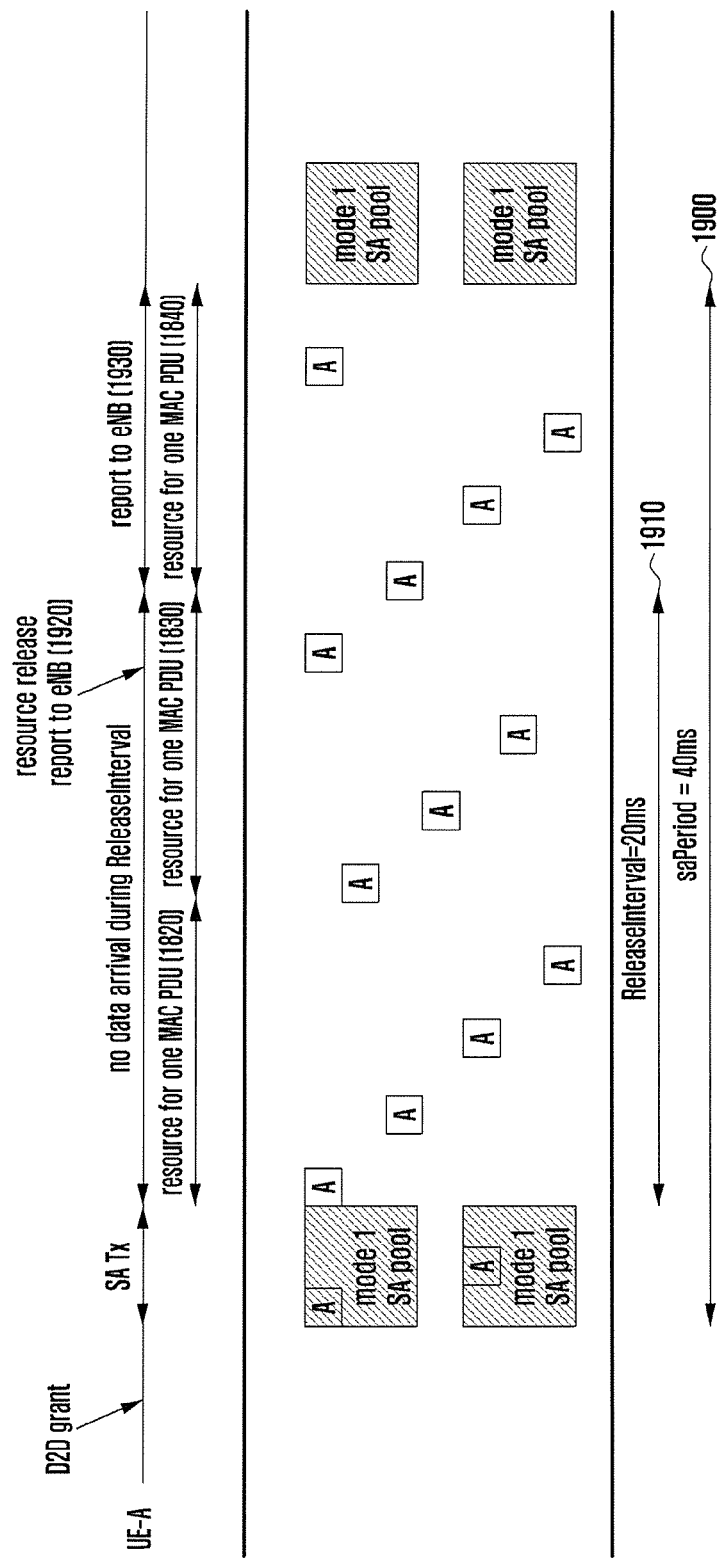
FIG. 19 is a diagram illustrating a resource release operation of the UE in mode 1 communication according to an embodiment of the present invention.

FIG. 19 is a diagram illustrating a resource release operation of the UE in mode 1 communication according to an embodiment of the present invention. In FIG. 19, the saPeriod 1900 is 40 ms, and the ReleaseInterval 1910 is 20 ms. After the ReleaseInterval ends without arrival of new data, the Tx UE transmits a resource release message as denoted by reference number 1920 and gives up the transmission opportunity afterward as denoted by reference number 1930.

The ReleaseInterval can be a predetermined value applied to all UEs commonly. The ReleaseInterval can also be a cell-specific value shared by all UEs located in the same cell. The D2D pools having different periods can have different release conditions (different values of ReleaseInterval) and thus pool-specific ReleaseInterval values can be used. The parameter ReleaseInterval can be notified from the eNB to the UE through system information or higher layer signaling.

In Alt. 2 and Alt. 4, if there are no data to transmit in the buffers of all Tx UEs, the Tx UE transmits no MAC PDU in the data resource. The Tx UE can also transmit a special MAC PDU to notify of the absence of data in the current MAC PDU explicitly. The special MAC PDU can be predefined to notify the Rx UE that the MAC PDU is indicative of the absence of data other than real data transmission. If there is no data transmission, Alt. 2 and Alt. 4 can be used together.

Although the description has been directed to the mode 1 communication, the above described methods can be applied to the mode 2 communication. The mode 2 communication differs from the mode 1 communication in that the UE selects the data and SA transmission resources autonomously.

The resource release mechanism of Alt. 4 is not limited to the case where there are no data to be transmitted at the SA transmission timing. The resource release mechanism of Alt. 4 can be applied to the normal situation where the UE has no data to transmit at every occasions of the allocated data resource.

Figure 20A:
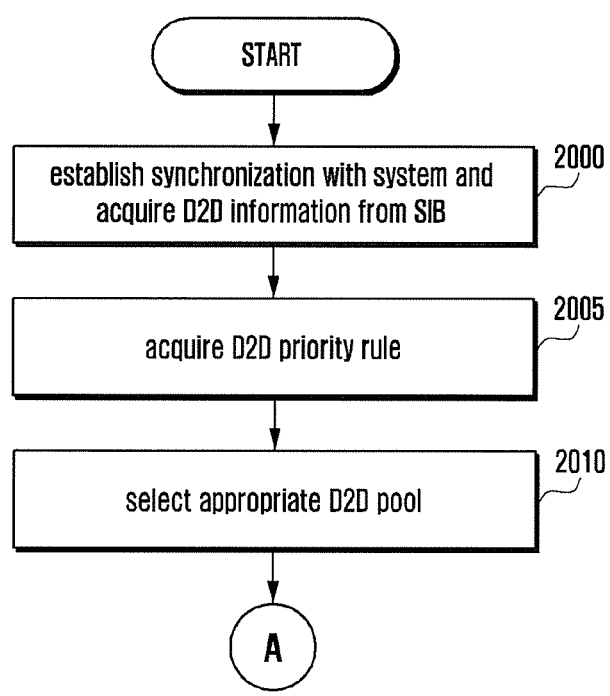
FIGS. 20A and 20B are flowcharts illustrating a UE operation procedure in the case where the D2DSS resource and other D2D pools are overlapped according to an embodiment of the present invention.
Figure 20B:
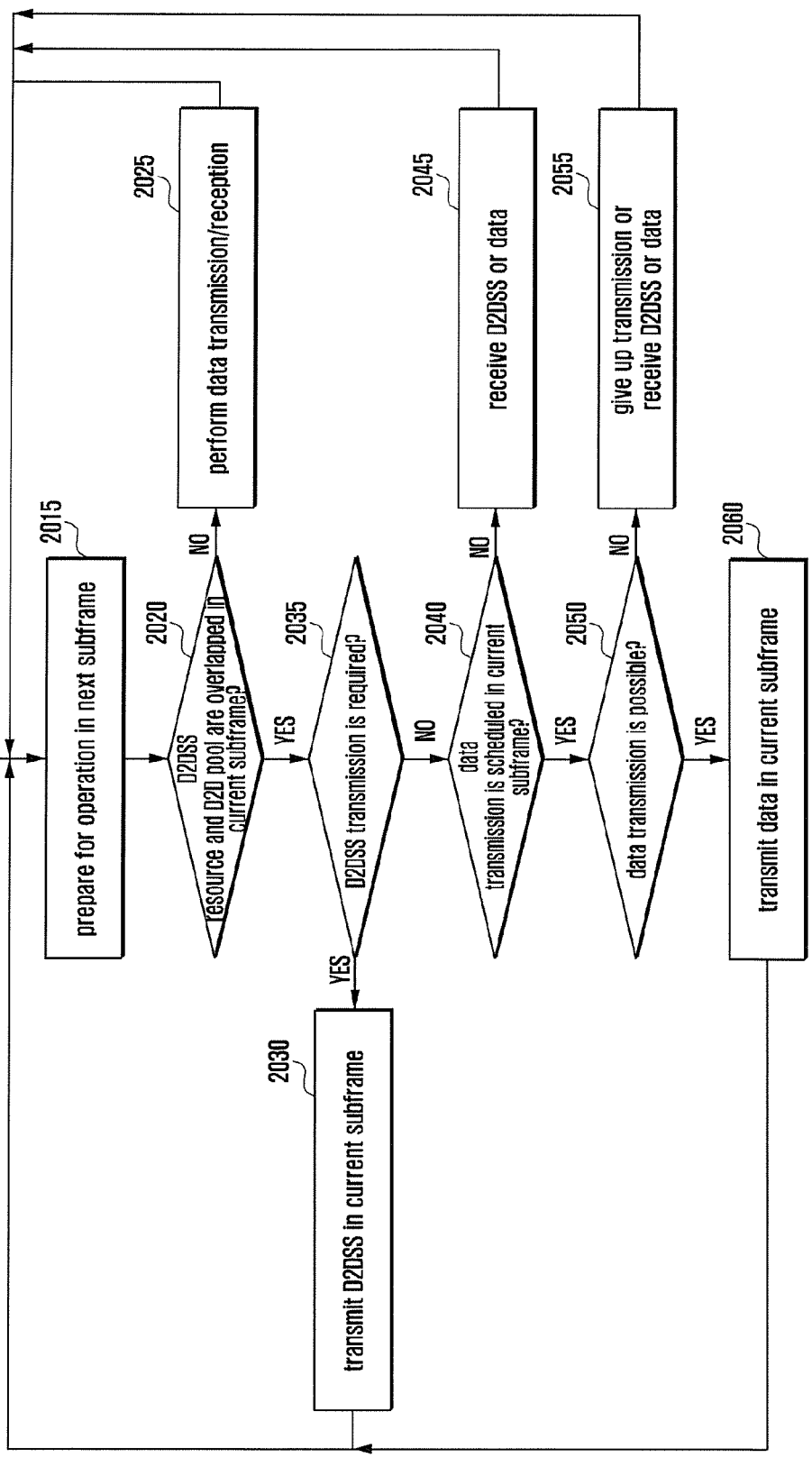

FIGS. 20A and 20B are flowcharts illustrating a UE operation procedure in the case where the D2DSS resource and other D2D pools are overlapped according to an embodiment of the present invention.

The UE establishes synchronization with the system and acquires information on the D2D pool, D2DSS, and other D2D operations from an SIB at step 2000, and acquires a predetermined or preconfigured D2DSS priority rule at step 2005. If the SIB includes a priority indicator, the UE decodes the priority indication bit included in the SIB. The UE selects an appropriate D2D pool according to the communication or discovery operation at step 2010. The UE performs next loop operation in each subframe within the D2D pool. The UE prepares for an appropriate operation (data transmission/reception) in the next subframe at step 2015. Afterward, the UE determines whether the current subframe is the subframe in which the D2DSS resource and D2D pool are overlapped at step 2020. If not, the UE performs an appropriate operation (data transmission/reception) in the current subframe at step 2025 and returns the procedure to step 2015. If the current subframe is the subframe in which the D2DSS resource and D2D pool are overlapped. The UE determines whether D2D transmission is instructed by the eNB or triggered by an event at step 2035. If so, the UE transmits the D2DSS and PD2DSCH (PD2DSCH transmission is selective) in the current subframe at step 2030. At this time, if there is other data to transmit, the UE gives up the data transmission. Afterward, the UE returns the procedure to step 2015.

If the UE is not instructed or triggered to transmit the D2DSS, the UE determines whether it has any data scheduled in the current subframe at step 2040. If it has no data scheduled in the current subframe, the UE receives the D2DSS or data transmitted by another UE in the current subframe at step 2045 and returns the procedure to step 2015. If it has any data scheduled in the current subframe, the UE determines whether the data can be transmitted according to the D2DSS priority rule at step 2050. In the case that there are two UEs of which one has been scheduled to transmit data and the other has been scheduled to transmit D2DSS in the current subframe, if the D2DSS priority rule specifies that when one UE transmits a D2DSS the others cannot transmit data, the UE having the data to transmit cannot transmit the data. If the UE can transmit data, the UE transmits the data in the current subframe at step 2060 and returns the procedure to step 2015. If the UE cannot transmit the data, the UE gives up data transmission in the current subframe and receives the D2DSS or data transmitted by another UE at step 2055.

Figure 21:
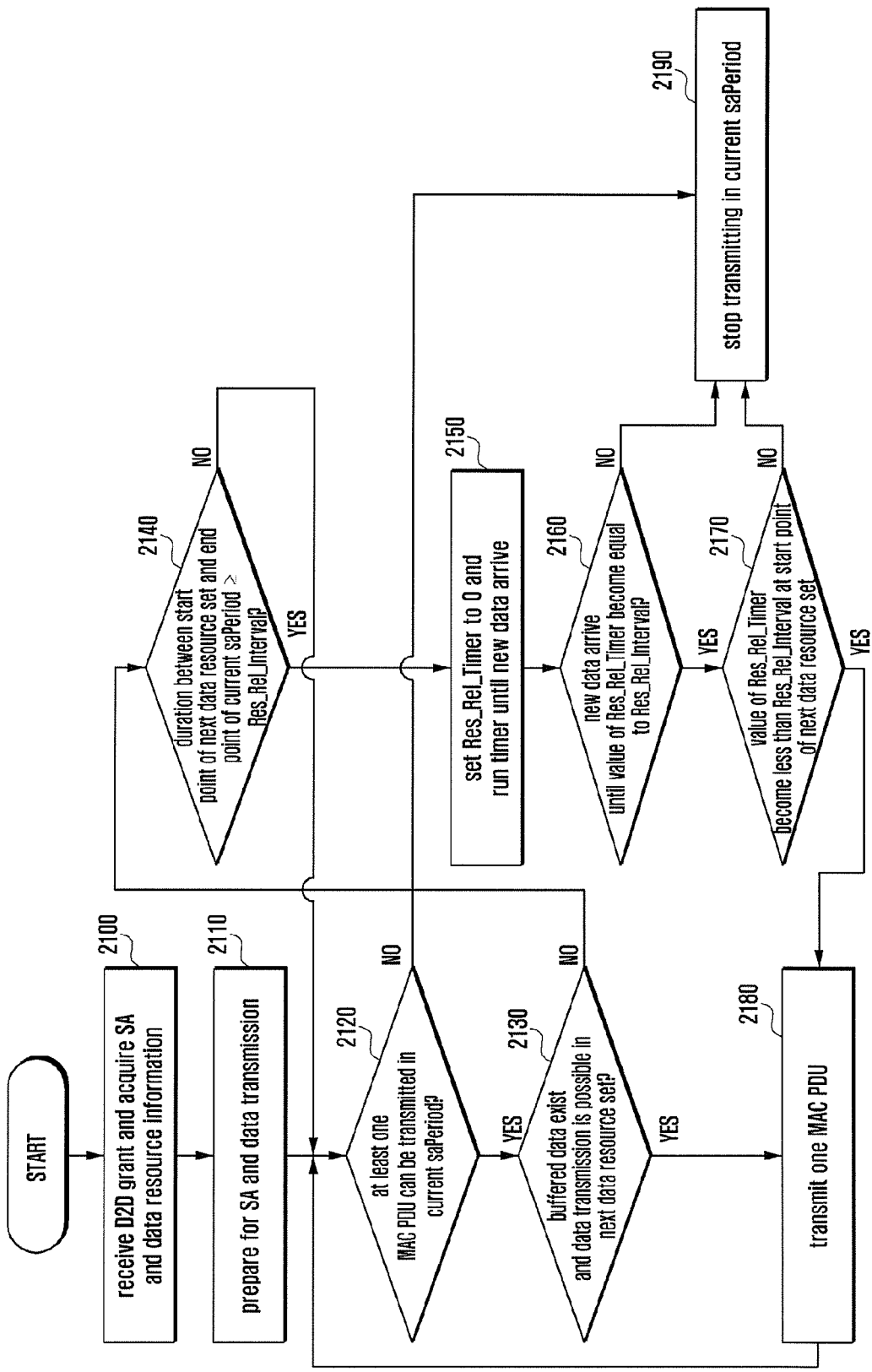
FIG. 21 is a flowchart illustrating an operation procedure of the Tx UE using the resource release mechanism according to an embodiment of the present invention.

FIG. 21 is a flowchart illustrating an operation procedure of the Tx UE using the resource release mechanism according to an embodiment of the present invention. Referring to FIG. 21, the Tx UE receives a D2D grant from the eNB and acquires information on the allocated SA and data resource at step 2100. Next, the Tx UE transmits the SA in the SA pool and prepares for data transmission in the data pool of the current saPeriod at step 2110. Next, the Tx UE determines whether at least one MAC PDU can be transmitted in the current saPeriod at step 2120. If no, the Tx UE stops transmitting data in the current saPeriod at step 2190. If at least one MAC PDU can be transmitted in the current saPeriod, the Tx UE determines whether the data buffered in the buffer can be transmitted in the next data resource set at step 2130. If so, the Tx UE transmits one MAC PDU in the next data resource set at step 2180 and returns the procedure to step 2120. If the data buffered in the buffer cannot be transmitted in the next data resource at step 2130, the UE determines whether the interval between the start point of the next data resource set and the end point of the current saPeriod is greater than Res_Rel_Interval at step 2140. If so, the UE returns the procedure to step 2120 to determine whether at least one MAC PDU can be transmitted in the current saPeriod and, if so, sets the Res_Rel_Timer to 0 at the start point of the next data resource set and runs the timer until new data arrive at step 2150. The UE determines whether new data arrive before the value of the Res_Rel_Timer becomes equal to the Res_Rel_Interval (that is, when the value of the Res_Rel_Timer is less than the Res_Rel_Interval) at step 2160. If so, the UE determines whether the value of the Res_Rel_Timer is less than the Res_Rel_Interval at the start point of the next data resource set at step 2170 and, if so, the Tx UE transmits one MAC PDU in the next data resource set at step 2180 and, otherwise, stops transmitting data in the current saPeriod at step 2190.

Figure 22:
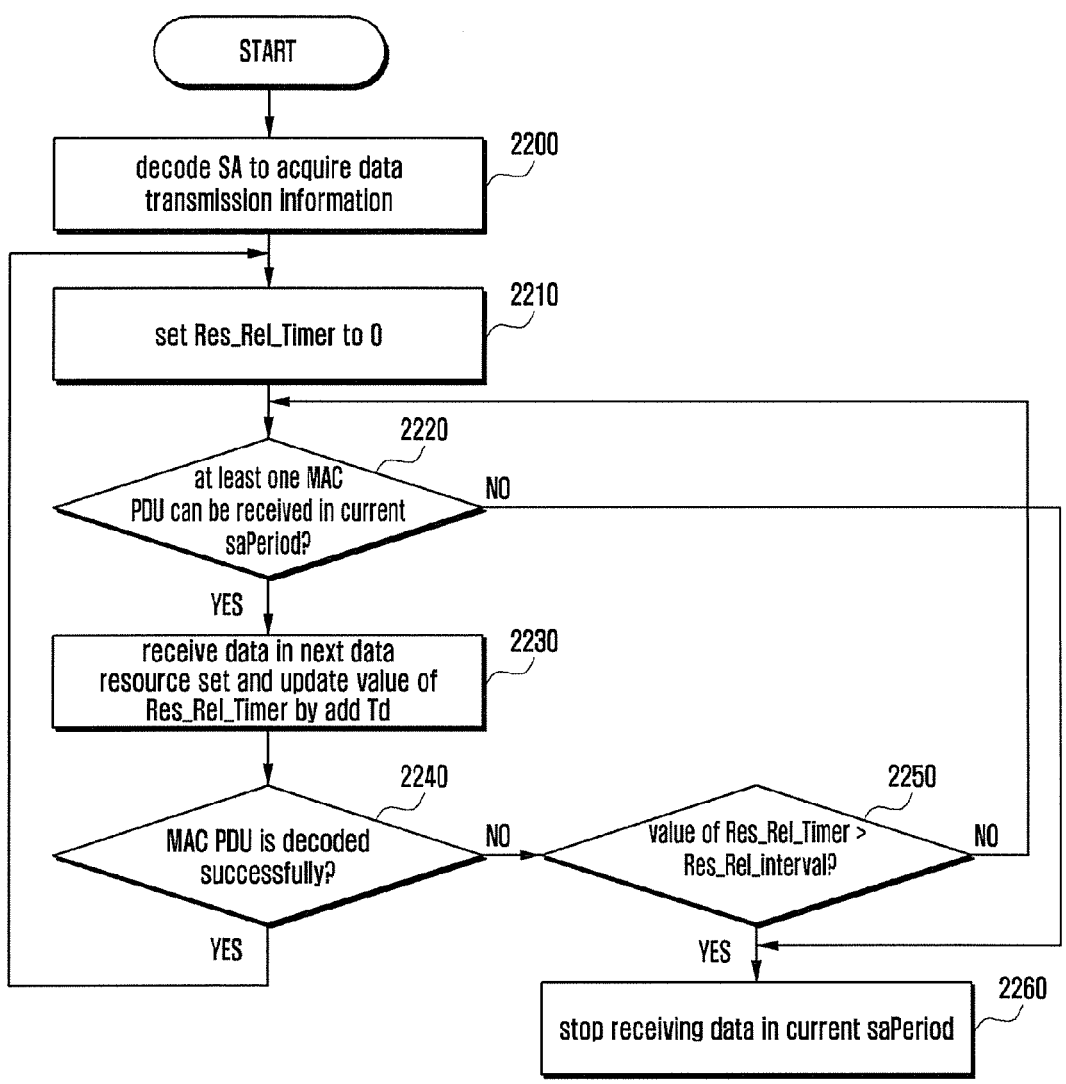
FIG. 22 is a flowchart illustrating an operation procedure of the Rx UE using the resource release mechanism according to an embodiment of the present invention.

FIG. 22 is a flowchart illustrating an operation procedure of the Rx UE using the resource release mechanism according to an embodiment of the present invention. Referring to FIG. 22, the Rx UE decodes the SA in the SA pool to acquire the information on the data transmission in the data pool of the current saPeriod at step 2200. The Rx UE sets the Res_Rel_Timer to 0 at step 2210. The Rx UE determines whether at least one MAC PDU can be received in the current saPeriod. If not, the Rx UE stops receiving data in the current saPeriod at step 2260. If so, the Rx UE receives data in the next data in the next data resource set and updates the Res_Rel_Timer to the value obtained by adding the data resource set duration (Td) at step 2230. The Rx UE determines whether it can decode the MAC PDU at step 2240. If so, the UE returns the procedure to step 2210 to set the Res_Rel_Interval to 0. If not at step 2240, the Rx UE determines whether the value of the Res_Rel_Timer is greater than the Res_Rel_Interval at step 2250. If so, the Rx UE stops receiving data in the current saPeriod at step 2260. If not at step 2260, the Rx UE returns the procedure to step 2220 to determine whether it can receive at least one MAC PDU in the current saPeriod.

Figure 23:
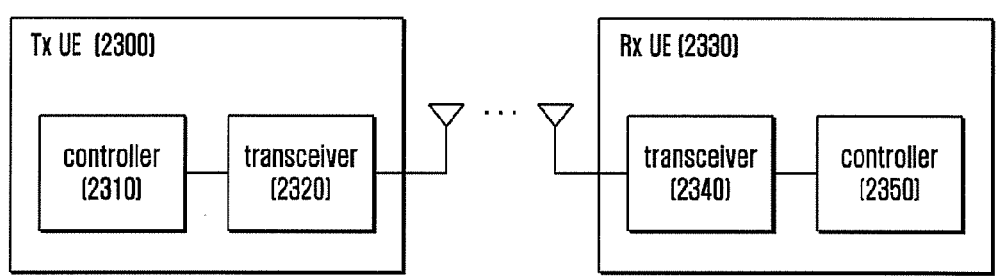
FIG. 23 is a block diagram illustrating configurations of the Tx and Rx UEs according to an embodiment of the present invention.

FIG. 23 is a block diagram illustrating configurations of the Tx and Rx UEs according to an embodiment of the present invention. Referring to FIG. 23, the Tx UE 2300 includes a controller 2310 and a transceiver 2320. The controller 2310 controls the transceiver 2320 according to the first to third embodiments of the present invention. The transceiver 2320 can transmit/receive data or control signals to/from an eNB or an Rx UE. The Rx UE 2330 includes a controller 2350 and a transceiver 2340. The controller 2350 controls the transceiver 2340 according to the first to third embodiments of the present invention. The transceiver 2350 can transmit/receive data or control signals to/from the eNB or the Rx UE according to the first to third embodiments of the present invention.

As described above, the present invention is advantageous in terms of providing periodic WAN channel monitoring method for receiving WAN data and a D2D-WAN switching method of the D2D UE by taking the WAN operation priority into consideration.

Also, the present invention is advantageous in terms of specifying the UE operation for the case where the D2D pools are overlapped and a rule of priority.

Also, the present invention is advantageous in terms of providing a method of demodulating PD2DSCH in the D2DSS resource.

Also, the present invention is advantageous in terms of specifying the operation of the UE which has no data to transmit.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for operating a terminal in a wireless communication system, the method comprising:
   receiving information on a discovery pool and information on at least one subframe to monitor a physical downlink control channel (PDCCH);
   determining whether to monitor the PDCCH in a current subframe based on the information on the at least one subframe to monitor the PDCCH in a discontinuous reception (DRX) mode;
   determining whether the current subframe is included in the discovery pool for a device to device (D2D) operation based on the information on the discovery pool, if the current subframe is not a subframe to monitor the PDCCH; and
   performing switching to the D2D operation, if the current subframe is included in the discovery pool.

2. The method of claim 1, further comprising:
   monitoring the PDCCH if the current subframe is the subframe to monitor the PDCCH.

3. The method of claim 1, wherein the information on the at least one subframe to monitor the PDCCH comprises paging occasion information and information on the DRX mode.

4. The method of claim 1, further comprising:
   identifying a system frame number (SFN) of the current subframe and whether the DRX mode is applied in the current subframe.

5. The method of claim 1, further comprising:
   determining whether a resource for transmitting a device-to-device (D2D) synchronization signal and the discovery pool are overlapped, and
   determining whether a transmission of the D2D synchronization signal is triggered, if the resource for transmitting the D2D synchronization signal and the discovery pool are overlapped.

6. The method of claim 1, wherein the information on the discovery pool comprises offset information of a serving cell and neighbor cells and information on a period of the discovery pool.

7. The method of claim 5, further comprising:
   transmitting, if the transmission of the D2D synchronization signal is triggered, the D2D synchronization signal.

8. The method of claim 7, further comprising:
   transmitting D2D data to another terminal, if the transmission of the D2D synchronization signal is not triggered.

9. The method of claim 7, further comprising:
receiving at least one of D2D data and a D2D synchronization signal from another terminal, if the transmission of the D2D synchronization signal is not triggered.

10. A terminal in a wireless communication system, comprising:
a transceiver configured to transmit or receive signals to from at least one of a base station and another terminal; and
a controller configured to control to:
receive information on a discovery pool and information on at least one subframe to monitor a physical downlink control channel (PDCCH);
determine whether to monitor the PDCCH in a current subframe based on the information on the at least one subframe to monitor the PDCCH in a discontinuous reception (DRX) mode,
determine whether the current subframe is included in the discovery pool for a device to device (D2D) operation based on the information on the discovery pool, if the current subframe is not a subframe to monitor the PDCCH, and
perform switching to the D2D operation, if the current subframe is included in the discovery pool.

11. The terminal of claim 10, wherein the controller is further configured to control the transceiver to monitor the PDCCH if the current subframe is the subframe to monitor the PDCCH.

12. The terminal of claim 10, wherein the information on the at least one subframe to monitor the PDCCH comprises paging occasion information and information on the DRX mode.

13. The terminal of claim 10, wherein the controller is further configured to identify a system frame number (SFN) of the current subframe and whether the DRX mode is applied in the current subframe.

14. The terminal of claim 10, wherein the controller is further configured to determine whether a resource for transmitting a device-to-device (D2D) synchronization signal and the discovery pool are overlapped, and
determining whether a transmission of the D2D synchronization signal is triggered, if the resource for transmitting the D2D synchronization signal and the discovery pool are overlapped.

15. The terminal of claim 10, wherein the information on the discovery pool comprises offset information of a serving cell and neighbor cells and information on a period of the discovery pool.

16. The terminal of claim 14, wherein the controller is further configured to control the transceiver to transmit, if the transmission of the D2D synchronization signal is triggered, the D2D synchronization signal.

17. The terminal of claim 16, wherein the controller is further configured to control the transceiver to transmit D2D data to another terminal, if the transmission of the D2D synchronization signal is not triggered.

18. The terminal of claim 16, wherein the controller is further configured to control the transceiver to receive at least one of D2D data and a D2D synchronization signal from another terminal, if the transmission of the D2D synchronization signal is not triggered.

* * * * *